(12) United States Patent
Chen et al.

(10) Patent No.: US 11,700,670 B2
(45) Date of Patent: Jul. 11, 2023

(54) METHODS, SYSTEMS, AND APPARATUSES FOR PRESENCE DETECTION

(71) Applicant: Comcast Cable Communications, LLC, Philadelphia, PA (US)

(72) Inventors: Tianwen Chen, McLean, VA (US); Hongcheng Wang, Arlington, VA (US); Hong Li, Mount Laurel, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/006,068

(22) Filed: Aug. 28, 2020

(65) Prior Publication Data

US 2022/0070975 A1 Mar. 3, 2022

(51) Int. Cl.

| | |
|---|---|
| H04W 4/00 | (2018.01) |
| H04W 88/08 | (2009.01) |
| H04W 4/38 | (2018.01) |
| G08B 13/196 | (2006.01) |
| H04W 84/12 | (2009.01) |
| G08B 25/00 | (2006.01) |
| H04W 12/06 | (2021.01) |

(52) U.S. Cl.
CPC ...... *H04W 88/08* (2013.01); *G08B 13/19656* (2013.01); *G08B 25/008* (2013.01); *H04W 4/38* (2018.02); *H04W 12/06* (2013.01); *H04W 84/12* (2013.01)

(58) Field of Classification Search
CPC ..... H04W 88/06; H04W 88/08; H04W 12/06; H04W 80/04; H04W 4/38; H04W 84/12; H04W 84/18; G08B 13/19656; G08B 25/008
USPC ................ 370/338; 455/67.11, 226.1, 226.2
See application file for complete search history.

(56) References Cited

U.S. PATENT DOCUMENTS

| | | | |
|---|---|---|---|
| 2016/0127931 A1* | 5/2016 | Baxley | G06T 7/20 |
| | | | 455/67.16 |
| 2020/0128354 A1* | 4/2020 | Smith | H04W 64/00 |
| 2020/0322917 A1* | 10/2020 | Rosenberg | G07C 9/00571 |
| 2021/0122333 A1* | 4/2021 | Azarko | G07C 9/00309 |

* cited by examiner

*Primary Examiner* — Temica M Beamer
(74) *Attorney, Agent, or Firm* — Ballard Spahr LLP

(57) ABSTRACT

Methods, systems, and apparatuses for managing a wireless network are described herein. A wireless network may include a gateway device, an access point, and a group of client devices. An analytics engine may determine a signal characteristic data for a client device, which may indicate network telemetry data for each of the client devices or associated locations during a time period. The analytics engine may utilize a trained classifier to determine that a signal characteristic indicated by the signal characteristic data for a client device satisfies a threshold.

23 Claims, 15 Drawing Sheets

400

| Device ID | ACCESS POINT | TIME | RSSI | NOTE |
|---|---|---|---|---|
| 307A | 306A | 07:00:00 | -20 dBm | - |
| 307A | 306A | 11:12:00 | -37 dBm | - |
| 307A | 306A | 16:40:00 | -67 dBm | Sensor 308 |
| 307A | 306A | 16:41:00 | -80 dBm | - |

| Device ID | ACCESS POINT | TIME | RSSI | NOTE |
|---|---|---|---|---|
| 307C | 306C | 08:15:30 | -80 dBm | - |
| 307C | 306C | 08:15:35 | -67 dBm | Sensor 308 |
| 307C | 306C | 08:16:00 | -30 dBm | - |
| 307C | 306C | 08:30:00 | -35 dBm | - |

| Feature | Coef |
|---|---|
| num_device_5g | 0.459205 |
| num_device_2g | 0.429651 |
| tx_rssi_lower_25_5g | 0.372459 |
| tx_rssi_lower_25_2g | 0.272162 |
| rssi_std_2g | 0.033454 |
| num_switch_device | 0 |
| rssi_skew_5g | -0.066183 |
| rssi_std_5g | -0.086799 |
| rx_rssi_lower_25_5g | -0.111596 |
| rssi_skew_2g | -0.12748 |
| rx_rssi_lower_25_2g | -0.275728 |
| rssi_lower_25_2g | -0.605132 |
| rssi_lower_25_5g | -0.803694 |

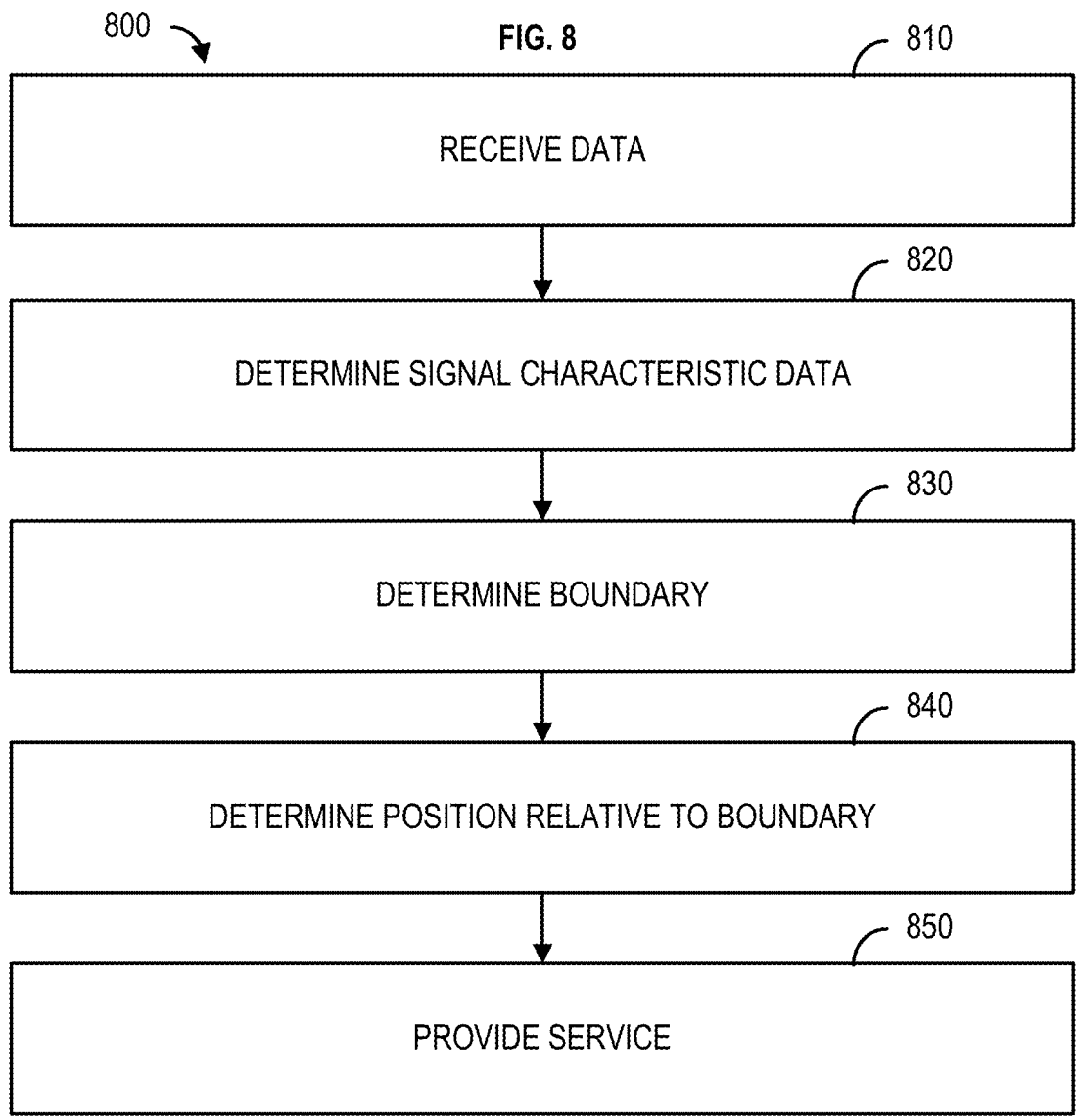

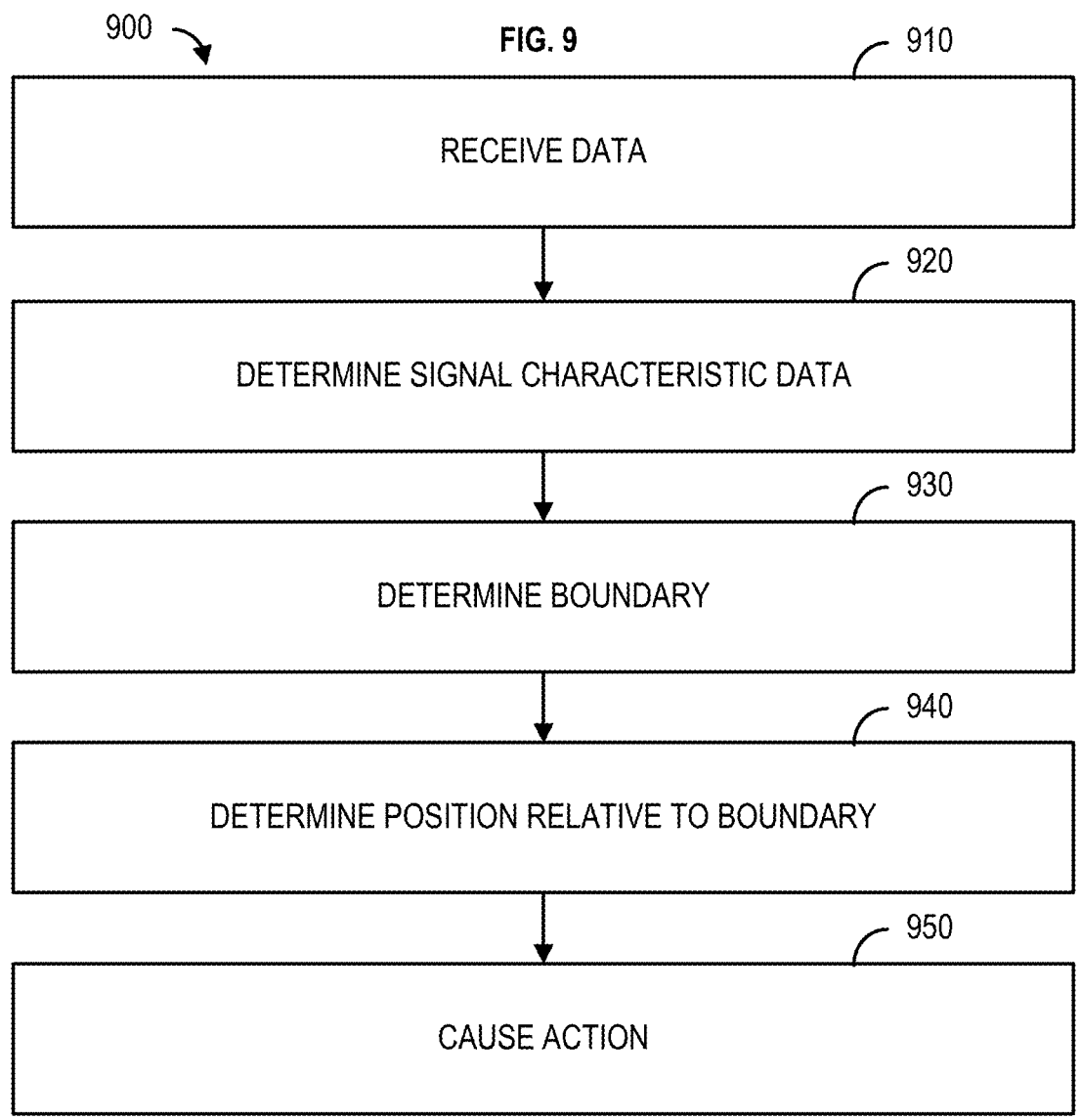

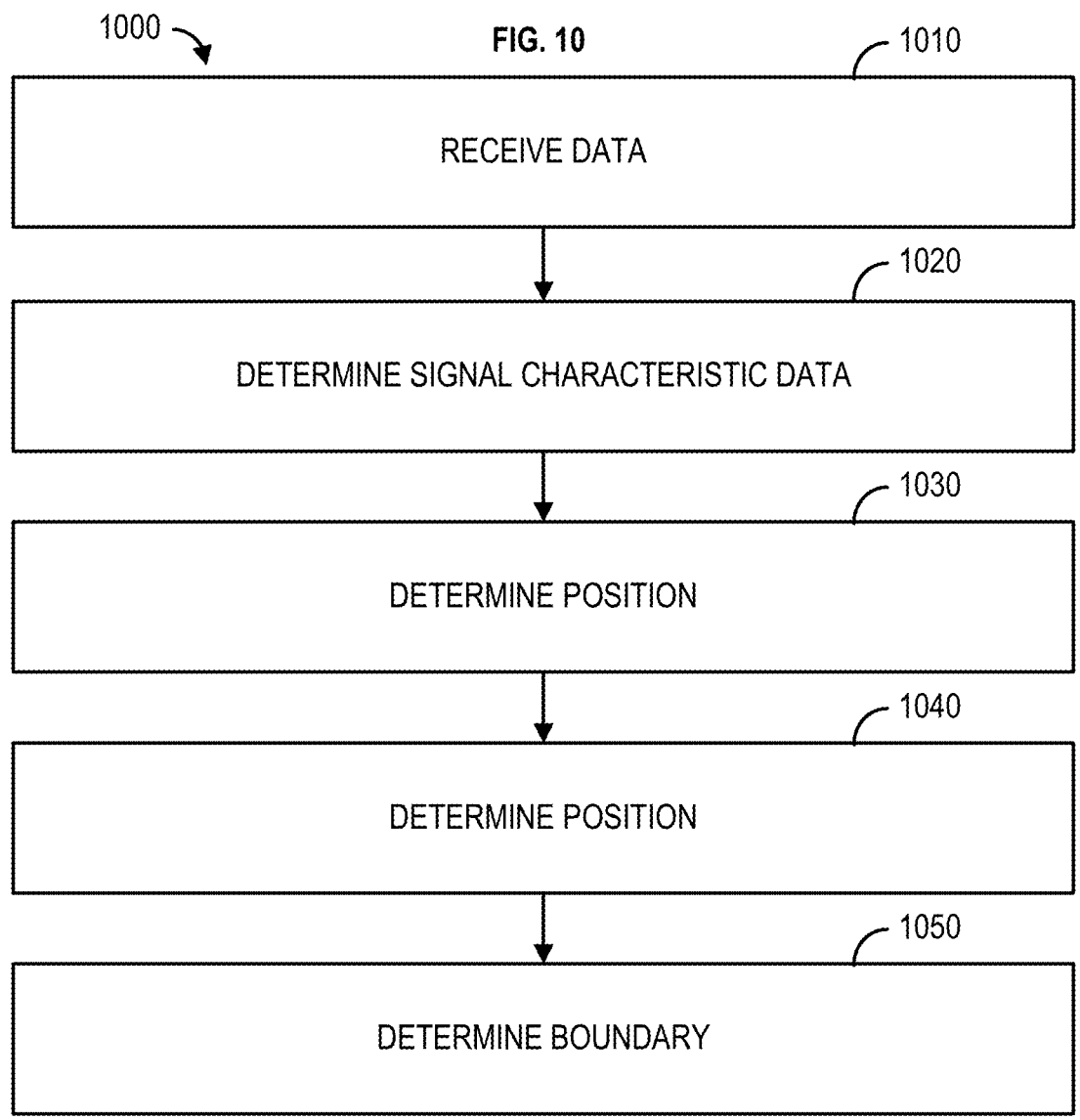

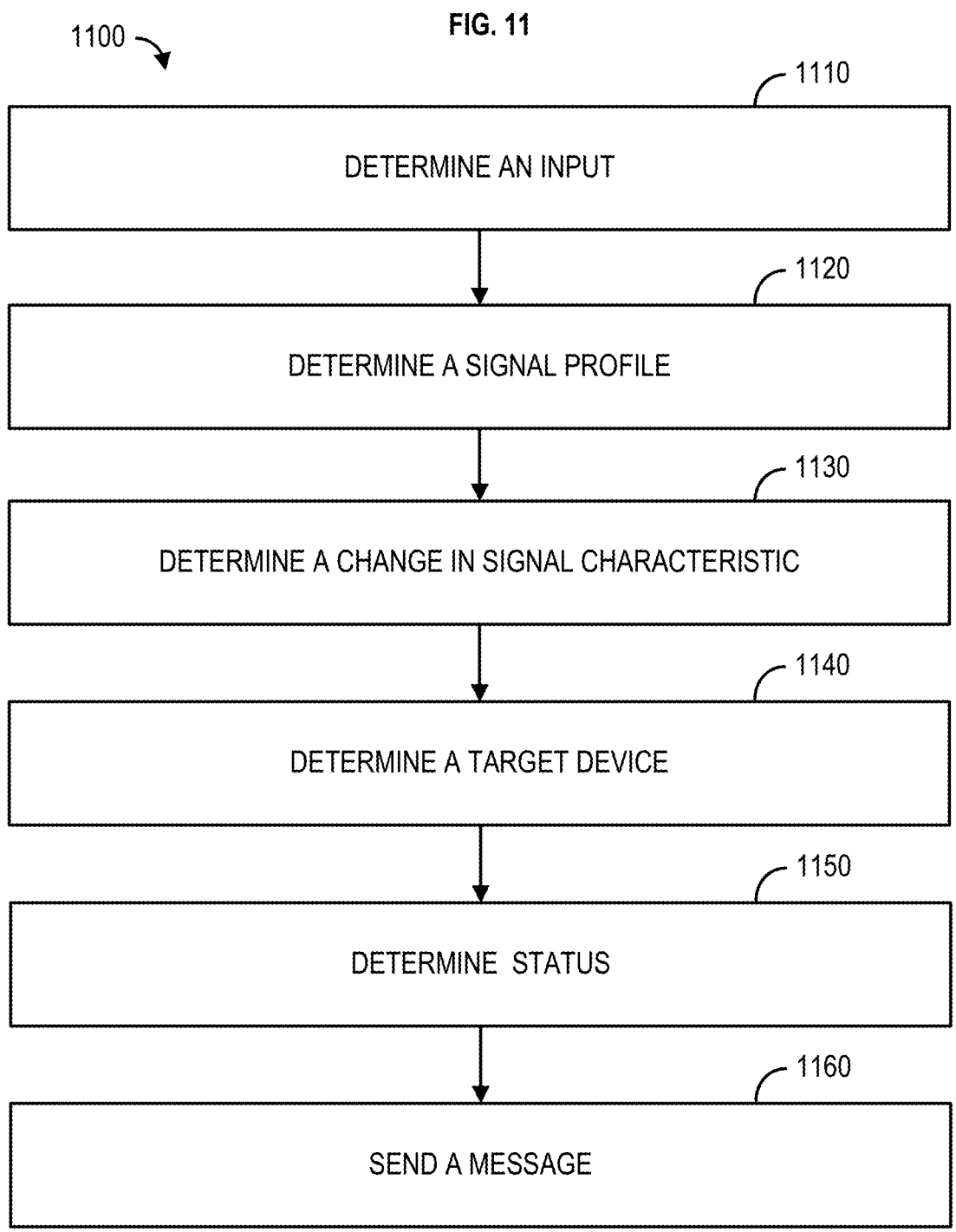

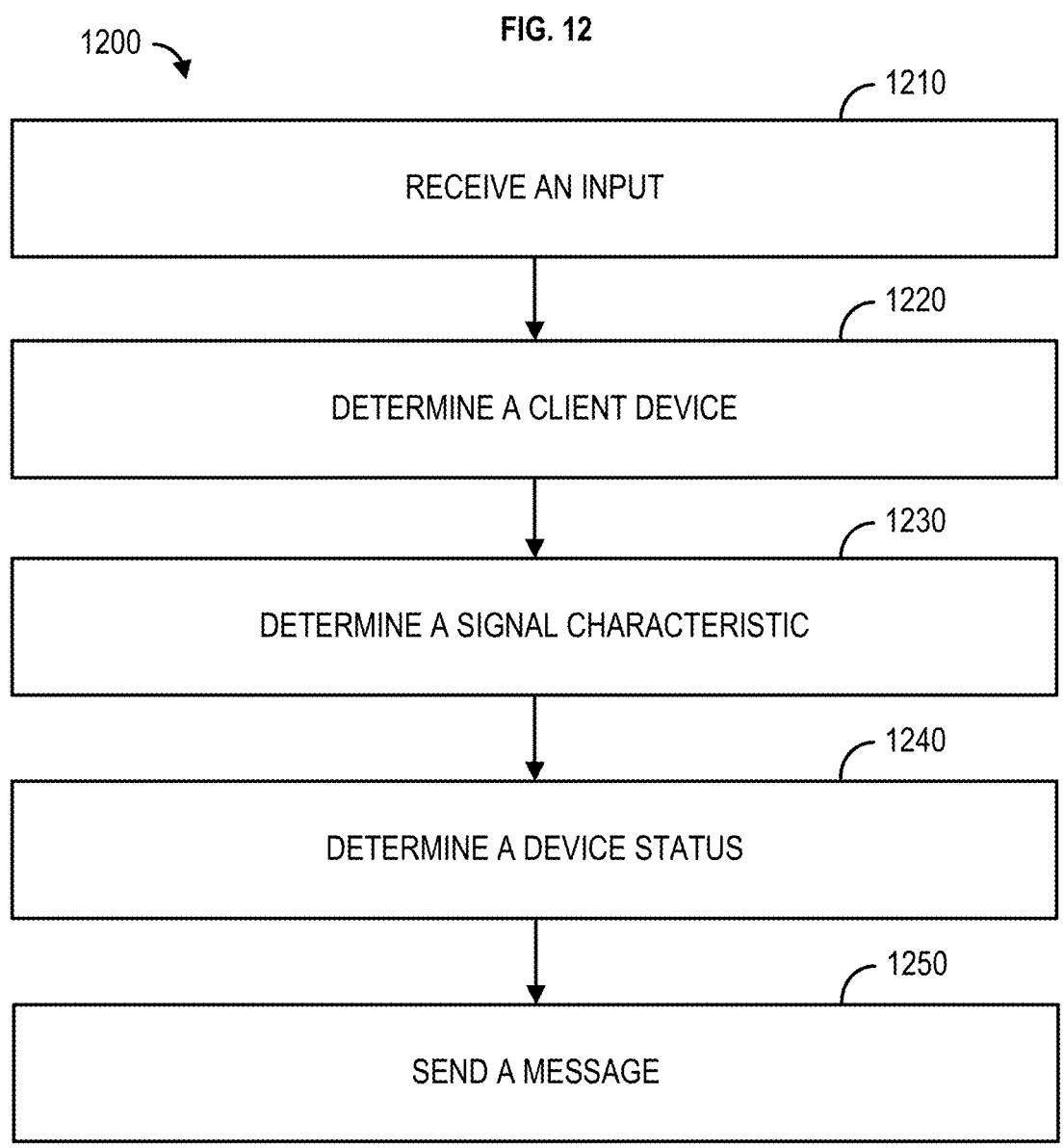

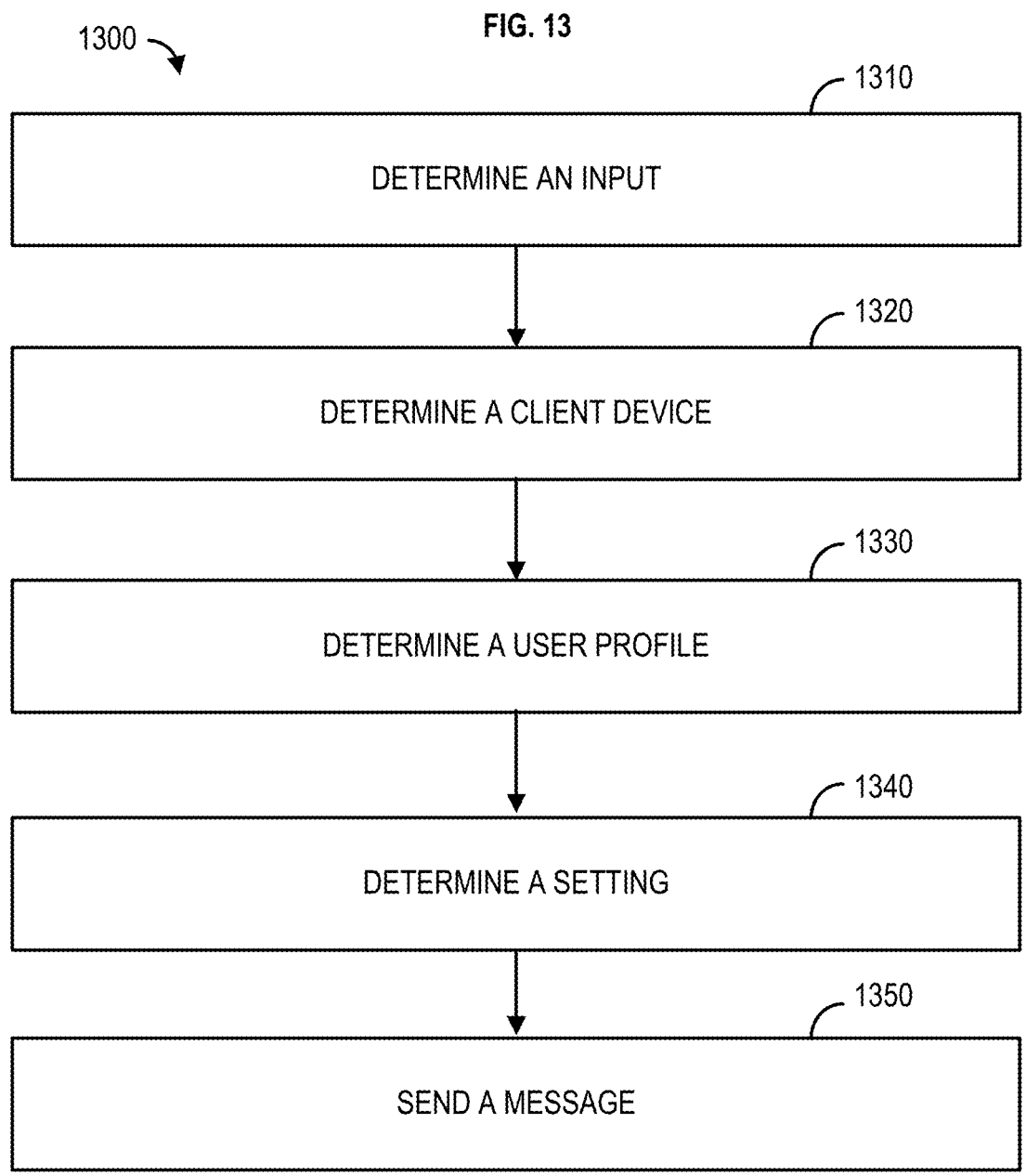

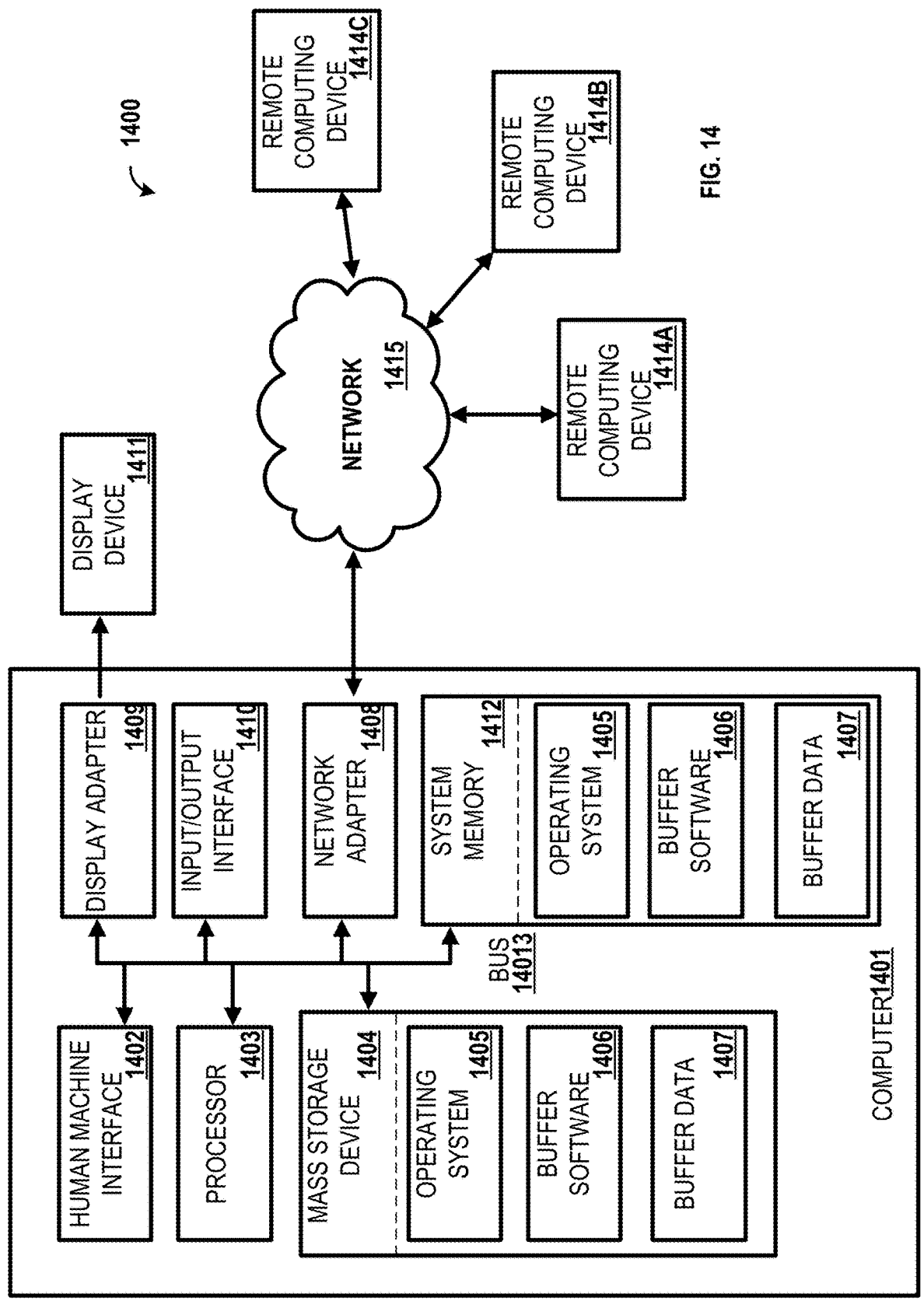

METHODS, SYSTEMS, AND APPARATUSES FOR PRESENCE DETECTION

BACKGROUND

A wireless network which provides network services to a premises may benefit from a clearly defined coverage area. However, due to network or signal characteristics, the coverage area is difficult to define. Present approaches simply rely on the maximal range of coverage of a particular access point or a group of access points to define the coverage area of a given network. This simplistic approach can lead to problems in relying on device connectivity to the network to detect the presence of a device within a boundary of the premises, as the coverage area will fall short of and/or exceed the physical boundaries of the premises, resulting in difficulties determining a status (e.g., inside the boundary, outside the boundary) of the device. Therefore, a new approach is needed to more precisely define a border of the coverage area and adapt that coverage area to the needs of the premises.

SUMMARY

It is to be understood that both the following general description and the following detailed description are exemplary and explanatory only and are not restrictive. Methods, systems, and apparatuses for presence detection are described herein. A wireless network may include one or more access points (AP) and one or more client devices. Signals sent to and received from the one or more client devices or one or more access points may be analyzed to determine signal characteristic data. The signal characteristic data may be used to determine a client device signal profile. The client device signal profile may be used to determine a client device status. The client device status may relate to a physical location of a client device. A signal characteristic of a newly detected client device may be compared to the client device signal profile to determine the client device status (e.g., whether or not the client device is within a boundary of a premises or outside the boundary of the premises). One or more actions may be initiated based on the client device status, including security related actions, home automation related actions, and the like.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of the present description serve to explain the principles of the methods and systems described herein:

FIG. 4A shows an example client device signal profile;
FIG. 4B shows an example client device signal profile;
FIG. 5 shows an example client device signal profile;
FIG. 8 shows an example method;
FIG. 9 shows an example method;
FIG. 10 shows an example method;
FIG. 11 shows an example method;
FIG. 12 shows an example method;
FIG. 13 shows an example method;
and
FIG. 14 shows a block diagram of an example system.

DETAILED DESCRIPTION

Figure 1:
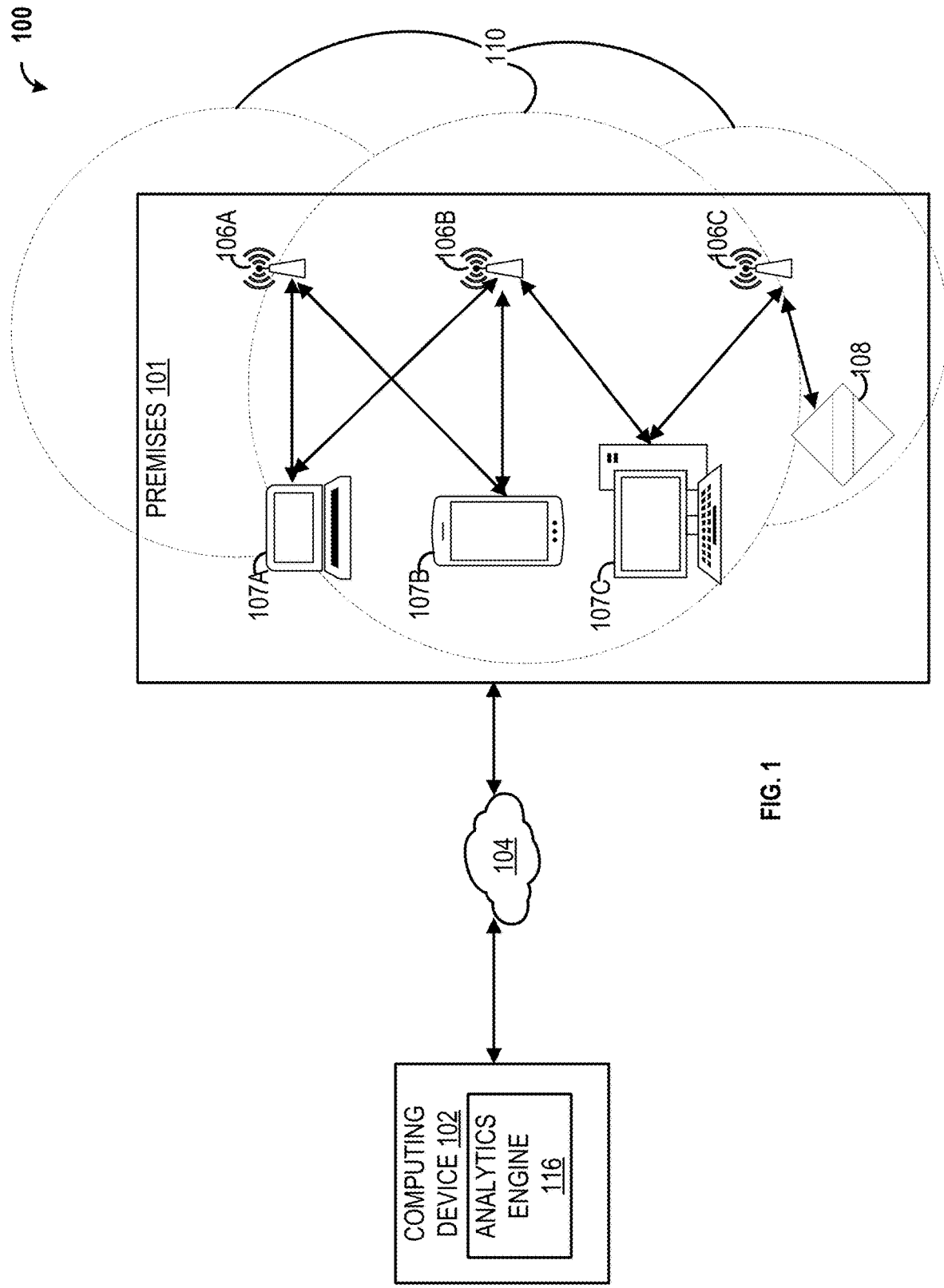
FIG. 1 shows a block diagram of an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

A wireless network may include one or more access points (APs) and one or more client devices. The one or more APs may provide network coverage over a coverage area. Any one of the one or more APs may receive a signal from a client device of the one or more client devices and send signal related information to a computing device. The signal may be associated with signal characteristics. The computing device may determine signal characteristic data for the client device based on the signal characteristics and use the signal characteristic data to determine a client device signal profile. The signal characteristics may comprise at least one of: a signal strength, a transmission power, a connection status, a transmission power, a connection status, channel information, an authentication status, an authorization status, network traffic, a signal to noise ratio, a data throughput, a bit error rate, a packet error rate, a packet retransmission rate, combinations thereof, and the like. The signal characteristics may change as the one or more client devices, or the one or more APs, move around a premises.

The client device signal profile may be associated with the client device as well as a status of the client device. The status of the client device may relate to a location of the client device (e.g., within a boundary of the premises or outside the boundary of the premises). For example, the client device signal profile may comprise a signal characteristic (e.g., RSSI) associated with the client device being located at a specific location inside the boundary of the premises. Likewise, the client device signal profile may comprise a signal characteristic associated with the client device being located outside the boundary of the premises.

In an embodiment, an indication that a sensor has been triggered may be determined, for example, when a door or window is opened, a security camera has detected an event such as a person passing in front of it, a door bell is activated, combinations thereof, and the like. When the indication is received, a client device associated with the triggered sensor may be determined, along with which client devices are within the boundary of the premises, which client devices are outside the boundary of the premises, which client devices are mobile, which client devices are stationary, combinations thereof, and the like. The client device may be determined to be associated with the triggered sensor based on the signal characteristic of the client device. For example, the signal characteristic associated with the client device being in proximity to the triggered sensor may be determined upon initialization or learned over time.

In an embodiment, the client device signal profile may be used to determine the client device status. A signal characteristic of a client device signal profile of a newly detected client device may be determined. The signal characteristic of the client device signal profile of the newly detected client device may be compared to one or more previously determined client device signal profiles to determine the newly detected client device's status (e.g., where the newly detected client device is likely located). For example, if the signal characteristic of the client device signal profile of the newly detected client device resembles or matches the one or more previously determined client device signal profiles, wherein the one or more previously determined client device signal profiles comprise an indication of the client device status (e.g., inside the premises), it may be determined that the newly detected client device is inside the premises.

In an embodiment, one or more machine learning techniques may be used. A plurality of client device signal profiles for a plurality of client devices may be gathered over a time period. One or more machine learning classifiers may be trained according to the plurality of client device signal profiles. The trained machine learning classifiers may then be presented with a signal characteristic or the client device signal profile of the newly detected client device and make a determination as to the newly detected client device's status (e.g., where the newly detected client device is likely located).

The status of the newly detected client device may be used to determine an action to initiate. The action to initiate may be determined based on whether the newly detected device is a known client device or an unknown client device. For example, if the newly detected client device is a known client device, one or more home automation actions may be initiated (e.g., turning on a light, playing music, etc.). For example, if the newly detected client device is an unknown client device, one or more security related actions may be initiated (e.g., sending a notification, arming a security alarm, etc.).

Turning now to FIG. 1, a block diagram of an example system 100 for managing a wireless network associated with a premises 101 is shown. The premises 101 may be, for example, a building (e.g., a house, a retail establishment, an office, and the like), or any other area comprising a boundary (e.g., a park, a stadium, and the like). The system 100 may comprise one or more access points, for example access points 106A, 106B, 106C. The access points 106A, 106B, 106C may be configured to provide the wireless network. The wireless network may comprise, for example, a Wi-Fi network. While three access points 106A, 106B, 106C are shown, it is understood that any number of access points may be used. For example, a single access point may be used to provide the wireless network. Each of the access points 106A, 106B, 106C may be associated with an identifier such as a service set identifier (SSID) or media access control (MAC) address.

One or more client devices (e.g., a client device 107A, a client device 107B, a client device 107C) may utilize the wireless network provided by the access points 106A, 106B, 106C to communicate with one or more other devices, to receive one or more services, and/or to otherwise interact with one or more other devices. While three client devices 107A, 107B, 107C are shown, it is understood that any number of client devices may be used. For example, a single client device (e.g., the client device 107A) may utilize the wireless network. The client devices 107A, 107B, 107C may communicate over the wireless network by sending and receiving electromagnetic signals, such as electromagnetic waves/signals that fall within the radio frequency (RF) band of 10 kHz to 1 THz. Other electromagnetic signals are contemplated. The client devices 107A, 107B, 107C may send and/or receive electromagnetic signals from and/or to the access points 106A, 106B, 106C.

The wireless network provided by the access points 106A, 106B, 106C to exchange electromagnetic signals with the client devices 107A, 107B, 107C may be associated with a coverage area 110. The coverage area 110 may be defined by the extent of the area to which the electromagnetic signals are transmitted by the access points 106A, 106B, 106C. Accordingly, the coverage area 110 may be co-extensive with one or more boundaries (e.g., fences, walls, property lines, sidewalks, etc.) of the premises 101, may extend beyond one or more boundaries of the premises 101, may not reach one or more boundaries of the premises 101, combinations thereof, and the like.

The electromagnetic signals exchanged by the access points 106A, 106B, 106C and the client devices 107A, 107B, 107C may be associated with certain signal characteristics. The signal characteristics may comprise at least one of: a signal strength, a transmission power, a connection status, channel information, an authentication status, an authorization status, network traffic, a signal to noise ratio, a data throughput, a bit error rate, a packet error rate, a packet retransmission rate, combinations thereof, and the like.

The signal strength may represent the power of a signal received by a receiving antenna (e.g., an antenna of any of the access points 106A, 106B, 106C or any of client devices 107A, 107B, 107C). The signal strength may comprise a value associated with the transmission or reception of the signal, for example as measured in decibels. The transmission power may represent the movement of electrical energy in a field. For example, the transmission power may represent the amount of electromagnetic energy sent from an antenna, for example as measured in watts. The connection status may represent whether or not a client device (e.g., the client device 107A) of any of client devices 107A, 107B, 107C is presently connected to the wireless network or not. For example, after sending a probe request, the client device 107A may be admitted to access the wireless network and communicate thereon. As such, the connection status associated with the client device 107A may comprise an indication that the client device 107A is presently "connected" to the wireless network. Likewise, the connection status may indicate that the client device 107A is "not connected" to the wireless network. Channel information may comprise information related to a frequency (e.g., channel) on which any of the client devices 107A, 107B, 107C is communicating with any of the access points 106A, 106B, 106C. For example, the channel information may indicate a frequency of 2.47 GHz or the like. The authentication status may represent whether or not the client device any of the client devices 107A, 107B, 107C has been authenticated (e.g., whether or not the client device is validated and/or verified). The authorization status may refer to actions or communications the client devices 107A, 107B, 107C are permitted to execute via the wireless network (e.g., permission status). Network traffic may represent an amount of data being sent or received by any of the access points 106A, 106B, 106C, or client devices 107A, 107B, 107C via the wireless network, how many devices are connected to the wireless network, combinations thereof, and the like. The signal to noise ratio may represent a measure comparing the level of a desired signal to the level of background noise. The data throughput may represent a rate of data transfer across the wireless network. The data throughput may be associated with a bandwidth. The data throughput may represent a rate of successful transmission of data packets. The bit error rate may represent a number of bit errors per unit time associated with bits sent over the wireless network. The bit error rate may be associated with noise, interference, distortion bit synchronization errors, combinations thereof, and the like. The packet error rate may represent a number of packets sent but not successfully received per number of packets sent. The packet retransmission rate may represent a number of packets resent per a number of packets initially sent. The packet retransmission rate may be associated with errors such as transmission errors or formatting errors.

The signal characteristics are subject to change and/or vary based on, for example, movement of any of the client devices 107A, 107B, 107C and/or the access points 106A, 106B, 106C, configuration of the client devices 107A, 107B, 107C and/or the access points 106A, 106B, 106C, type of client device and/or access point, physical characteristics associated with the premises 101 (e.g., walls between the client devices 107A, 107B, 107C and the access points 106A, 106B, 106C), environmental conditions such as storms or electromagnetic radiation, hardware or software characteristics such as the physical components of an antenna or parameters associated with software. For example, as a client device (e.g., the client device 107A) moves farther from an access point (e.g., the access point 106A), a received signal strength associated with a signal sent by the client device 107A as measured at the access point 106A will likely decrease, whereas if the client device 107A move closer to the access point, the received signal strength as measured at the access point 106A will likely increase. Similarly, when the client device 107A moves throughout the premises 101 such that at a first point in time the client device 107A has a line of sight to the access point 106A and at a second point in time there is a wall between the client device 107A and the access point 106A, the access point 106A may determine a signal characteristic associated with the signal transmitted by the client device 107A has changed (e.g., the RSSI has decreased). In a similar vein, when the client device 107A is located at a particular location inside or outside of the premises 101, or at a particular entrance point, in relation to the access point 106A, the received signal strength may have a particular value. That is to say, the signal characteristic data of the client device-AP connection may have known, persistent values at a particular location within the premises 101, for example inside a front entrance point. An event may occur which prompts the determination of a signal characteristic. For example, when the client device 107A enters the coverage area 110, a determination can be made, using the signal characteristic data, as to when and where the client device 107A entered the coverage area 110 (e.g., when a probe request is received), or when and where the client device 107A entered the premises 101.

The system 100 may comprise a sensor. For example, when the sensor (e.g., sensor 108) is triggered, the sensor 108 may send a signal to a computing device (e.g., the computing device 102) and at that time, the signal characteristics of signals transmitted by the client device 107A may be determined. As such, the signal characteristics may be correlated with a location of the client device 107A. For example, if the signal characteristic associated with the signals transmitted by the client device 107A are determined to have a particular value at a first time, and then, at a second time, the sensor 108 is triggered and the signal characteristic associated with the signal for the client device 107A is determined to have changed (e.g., the RSSI has increased or decreased simultaneously with the sensor 108 being triggered), the client device 107A may be determined to be at the door where the sensor 108 was triggered. Likewise, the signal characteristic associated with the signals transmitted by the client device 107A at the first time and the second time may be stored and thus, if at a third time, the signal characteristic associated with the signals transmitted by the client device 107A resemble the signal characteristics associated with the signals transmitted the client device 107A at the first time and/or second time, the location of the of the client device 107A may be determined.

The computing device 102 may comprise an analytics engine 116. The analytics engine 116 may be in communication with one or more sensors, for example the sensor 108. The sensor 108 may comprise a motion detection sensor, infrared sensor, camera sensor, magnetic sensor, window sensor, door sensor, or any other suitable sensor to detect the presence of an entity or a change in circumstances. For example, the sensor 108 may comprise a window sensor or a door sensor which, when the a window or a door is closed, maintains a magnetic connection but when window or the door is opened, the magnetic connection is broken and the signal is sent which indicates the window or the door has been opened or broken. When the sensor 108 is triggered (e.g., the door is opened), the analytics engine 116 may determine a change in the signal characteristic associated with any client device of the client devices 107A, 107B, 107C so as to determine whether, for example, the client device 107A is entering the premises 101 or exiting the premises 101. For example, when the sensor 108 is triggered, the analytics engine 116 may determine the RSSI associated with the client device 107A immediately before the sensor 108 was triggered is −67 dBm while the RSSI immediately after the sensor 108 was triggered is −30 dBM so as to determine the client device 107A has entered the premises 101. The analytics engine 116 may use this information to update a client device signal profile associated with the client device 107A and thereby. Similarly, when the sensor 108 is triggered, the analytics engine 116 may determine the signal characteristic profile of the client device 107A and compare the signal characteristic profile of the client device 107A to a historic signal characteristic profile of the client device 107A which indicates a device status associated with the signal characteristic. If the signal characteristic profile of the client 107A at the time the sensor 108 is triggered resembles or matches the historic signal characteristic profile of the client device 107A, the device status of the client device 107A at the time the sensor 108 is triggered may be determined.

Likewise, the signal characteristics may be determined periodically. For example, the signal characteristics may be determined at regular intervals throughout a period of time such as an hour, a day, a week, a month, etc. The signal characteristics may be determined upon installation. That is to say, a user may, during installation, determine, for example for the client device 107A, the client device signal profile associated with the client device 107A by moving about the premises 101 and logging signal characteristic data at various times and locations throughout the premises 101.

The signal characteristics may be represented as signal characteristic data. The signal characteristic data may comprise values (e.g., absolute or relative values associated with transmission power, received signal strength, traffic levels, or combinations thereof, and the like) associated with the signal characteristics as well as one or more results of operations performed on the signal characteristics. The signal characteristic data may comprise temporal information associated with the signal characteristics. The temporal information may comprise, for example, a timestamp, a date, an indication of a time period, combinations thereof, and the like. The signal characteristic data may comprise one or more identifiers associated with the signal characteristics. The one or more identifiers may be associated with any device that sent or received a signal from which the signal characteristic was determined. For example, an identifier of the client device 107A, an identifier of an access point 106A, combinations thereof, and the like. For example, the identifier may comprise a media access control (MAC) address, an Internet Protocol (IP) address, an international mobile subscriber identifier (IMSI), an international mobile equipment identity (IMEI), a serial number, a device name, combinations thereof, and the like. The signal characteristic data may comprise location information associated with the signal characteristics. For example, the location information may comprise GPS coordinates. The location information may comprise relative location information such as the location of a client device as determined by triangulating a distance between the client device 107A and a plurality of access points 106A, 106B, 106C.

The signal characteristic data may be associated with one or more signal characteristic values. For example, when a signal is received, and a signal characteristic is determined, an associated signal characteristic value may be determined. It may be determined whether or not the signal characteristic value fails to satisfy, satisfies, or exceeds a threshold. For example, the threshold may be associated with a signal characteristic that indicates a client device status as inside the boundary of the premises 101 or outside the boundary of the premises 101. For example, it may be determined that an RSSI value of −80 dBm is determined at the access point 106A when the client device 107A is located outside the boundary of the premises 101 and transmitting the signal to the access point 106A inside the premises 101.

As an example, the signal characteristic value may relate to an expected value of RSSI for the client device 107A at a particular location inside the premises 101. An aggregate of the one or more signal characteristic values may not meet or exceed the threshold when the mean RSSI for the client device 107A is determined to fall below the expected mean value. For example, the signal characteristic value may relate to an amount by which a level of RSSI for the client device 107A for a time interval during the day (e.g., an hour) deviates from the mean RSSI for the client device 107A throughout the day. When the level of RSSI for the client device 107A during the time interval deviates at least a specified number of standard deviations (e.g., 3) from the mean RSSI, the level of RSSI for that time interval may be considered an outlier and thus falling below (e.g., not meeting or exceeding) the signal characteristic threshold. For example, if the signal characteristic for the client device 107A fails to meet the signal characteristic threshold, the analytics engine 116 may determine the client device 107A is located outside the boundary of the premises 101.

In an embodiment, the client devices 107A, 107B, 107C may be configured to determine the signal characteristic. The client devices 107A, 107B, 107C may be configured to determine the signal characteristic by receiving an electromagnetic signal via an antenna. The antenna may be configured to transmit the electromagnetic signal to a transducer. The transducer may be configured to convert the analog electromagnetic signal into a digital signal suitable for processing and analysis. The client devices 107A, 107B, 107C may be configured to send any determined signal characteristics and/or signal characteristic data to the access points 106A, 106B, 106C and/or to a remote device (e.g., the computing device 102).

In an embodiment, the access points 106A, 106B, 106C may be configured to determine the signal characteristic. For example, the access points 106A, 106B, 106C may be configured to receive an electromagnetic signal (e.g., an electromagnetic wave) from client devices 107A, 107B, 107C via an antenna. The antenna may be configured to transmit the electromagnetic signal to a transducer. The transducer may be configured to convert the electromagnetic signal into a digital signal suitable for analysis and processing. The access points 106A, 106B, 106C may be configured to send any determined signal characteristics and/or signal characteristic data to a remote device (e.g., the computing device 102).

The computing device 102 may be, for example, a server. The server may be associated with a service provider such as an Internet service provider, a security service provider, or the like. The computing device 102 may be disposed locally or remotely. The computing device 102 may communicate with the access points 106A, 106B, 106C and/or the client devices 107A, 107B, 107C via a network 104. The network 104 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof.

The computing device 102 may be configured to provide services such as network (e.g., Internet) connectivity services, security services, content services, or other network-related services. Internet connectivity services may comprise, for example, providing access to a communications network such as the Internet through, for example, hard-wired broadband access such as dial-up access, multilink dial-up, integrated services digital networks, leased lines, cable internet access, digital subscriber lines, fiber optic networks, wireless broadband access such as satellite, mobile, WiMAX, wireless ISP or local multipoint distribution, hybrid access networks, packet radio, combinations thereof, and the like. Security services may comprise for example hardware such as sensors (window sensors, door sensors, motion detectors, control panels, electronic keypads, etc.) as well as software such as alarm software and accompanying communications software. For example, security services may comprise sending notifications, alerts, or other messages. For example, security services may comprise activating cameras, recording video, initiating alarms, triggering lighting devices or audio devices, combinations thereof, and the like. Content services may comprise providing content via streaming services, cable television, broadcast television, satellite television, video-on-demand, combinations thereof, and the like. Media services may also refer to social media services such as connectivity and interaction with social media platforms such as Facebook®, Twitter®, Snapchat®, Instagram®, TikTok®, combinations thereof, and the like. For example, the computing device 102 may allow the client devices 107A, 107B, 107C to interact with remote resources such as data, devices, files, security resources, or the like. The computing device 102 may be configured as (or disposed at) a central location (e.g., a headend, or processing facility), which may receive content (data, programming or the like), from multiple sources.

The analytics engine 116 may comprise hardware components and/or software components which are configured to receive and/or determine signal characteristic data associated with at least one client device (e.g., the client device 107A) of the client devices 107A, 107B, 107C, connected to the wireless network through a network device such the access points 106A, 106B, 106C so as to determine signal a client device signal profile and/or a wireless network signal profile. The computing device 102 may receive the signal characteristic data from the access points 106A, 106B, 106C and/or client devices 107A, 107B, 107C. The signal characteristic data may be determined based on inbound or outbound signals received or sent by the access points 106A, 106B, 106C and then the signal characteristic data may be sent to the computing device 102. For example, the signal characteristic data (e.g., RSSI) may be determined by the client devices 107A, 107B, 107C and sent to the access points 106A, 106B, 106C which may send the signal characteristic data to the computing device 102. Alternatively, the access points 106A, 106B, 106C may receive the signal, determine signal characteristic data, and send the signal characteristic data to the computing device 102. The computing device 102 may receive the signal characteristic from the client devices 107A, 107B, 107C or access points 106A, 106B, 106C and determine the signal characteristic data.

The analytics engine 116 may determine, for each client device of the client devices 107A, 107B, 107C, the client device signal profile. The analytics engine 116 may determine, for the one or more APs and client devices 107A, 107B, 107C, the wireless network signal profile associated with the premises 101. The analytics engine 116 may collect/aggregate/analyze signal characteristic data related to each of the client devices 107A, 107B, 107C.

The computing device 102 may be configured to determine the client device signal profile based on the signal characteristic data. For example, upon installation, or over the course of time, the computing device 102 may determine the signal characteristic data associated with the client device 107A so as to build the client device signal profile. For example, the analytics engine 116 may determine the RSSI of the client device 107A has a value of −30 dBm when the client device 107A is located inside a front entranceway of the premises 101, a value of −40 dBm when the client device 107A is located inside a rear entranceway of the premises 101, and a value of −67 dBm when the client device 107A is located external to the boundary of the premises 101. For example, during the course of a week, the analytics engine 116 may determine that the client device 107A is usually not connected to the wireless network between Monday and Friday and between the hours of 9:00 AM and 5:00 PM (e.g., the client device 107A is at a location other than the premises 101). In a similar fashion, the analytics engine 116 may determine the signal characteristic associated with the client device 107A is variable, but strong, Monday through Friday, between the hours of 7:00 AM and 9:00 AM (e.g., the client device 107A is connected to the wireless network and moving around the premises 101). For example, when the client device 107A enters the coverage area, the analytics engine 116 may determine an initial RSSI associated with the client device 107A. As the initial RSSI associated with the client device 107A increases, the analytics engine 116 may determine a distance between the client device 107A and, for example, the access point 106A is decreasing and thus, the analytics engine 116 may determine the client device 107A is approaching the access point 106A and by extension, the premises 101. The analytics engine 116 may use the signal characteristic data to determine signal characteristic data for each of the one or more client devices 107A, 107B, 107C for a given location, such as a particular entrance point of the premises 101, or a time interval, such as a day, combinations thereof, and the like. For example, the RSSI for the client device 107A may vary with respect to time throughout the day. The varying RSSI may correspond to movement of the client device 107A with respect to an access point (e.g., the access point 106A). Alternatively, or in addition, the level of RSSI for the client device 107A may not vary with respect to time throughout the day by any significant degree. For example, the client device 107A may be a stationary device (e.g., a set-top box, media player, etc.), and the level of RSSI may remain relatively static (e.g., constant) throughout the day.

The client device signal profile may comprise the signal characteristic data, changes in the signal characteristic data, or operations performed thereon. For example, the analytics engine 116 may determine, over a period of time, signal characteristic data associated with the client device 107A as received by the AP 106A. The analytics engine 116 may determine changes in the signal characteristic data over time, for example various signal strengths associated with various times and/or locations. The client device signal profile may also comprise an identifier associated with the client device 107A, such as a MAC address. The client device 107A associated with the MAC address may be a known client device. The client device signal profile may also comprise temporal information such as the time at which a signal was received by an AP 106A, or the time the sensor 108 was triggered and associated the signal characteristic data. For example, the client device 107A may send a signal (e.g., the probe request) to the access point 106A at 9:00 AM wherein the signal associated with the client device 107A comprises an RSSI of −30 dBm. At 9:01 AM, the sensor 108 (e.g., a door sensor) may be triggered and the RSSI associated with the client device 107A may be determined to be −40 dBm. At 9:02 AM, the RSSI associated with the client device 107A may be determined to be −67 dBm and thus, the client device 107A associated with that RSSI may be determined to have left the premises 101.

The computing device 102 may be configured to determine a wireless network signal profile by determining signal characteristic data associated with the access points 106A, 106B, 106C and client devices 107A, 107B, 107C connected to the wireless network. For example, the computing device 102 may determine the wireless network signal profile by determining a particular signal characteristic associated with a signal associated with the client devices 107A, 107B, 107C at a particular time. For example, it may be determined that at 3:00 AM every morning, the RSSI for every client device 107A, 107B, 107C connected to the wireless network is constant. In other words, at 3:00 AM every morning, every client device 107A, 107B, 107C connected to the wireless network is stationary. It may also be determined that at 9:00 AM every morning, the RSSI associated with every client device 107A, 107B, 107C connected to the wireless network is variable, that is to say the client devices 107A, 107B, 107C connected to the wireless network are moving around the premises 101. The computing device 102 may be configured to determine the network signal profile by determining signal characteristic data associated with the access points 106A, 106B, 106C and client devices 107A, 107B, 107C connected to the wireless network when the sensor 108 is triggered so as to determine the status of every client device 107A, 107B, 107C at the time the sensor 108 is triggered. That is to say, the triggering of the sensor 108 may prompt the computing device to determine signal characteristics associated with every client device presently connected to the wireless network.

The wireless network signal profile may include at least one of: a signal strength, a transmission power, a connection status, channel information, an authentication status, an authorization status, network traffic, a signal to noise ratio, a data throughput, a bit error rate, a packet error rate, a packet retransmission rate, combinations thereof, and the like for any given device connected to the wireless network including access points 106A, 106B, 106C and client devices 107A, 107B, 107C.

The computing device 102 may be configured to determine the boundary of the premises 101 and control access to the network based on the boundary of the premises 101 (e.g., determine a geofence). For example, upon receiving the signal from the sensor 108, and determining that the client device 107A is within the boundary of the premises (as described above) the analytics engine 116 may continue to monitor the signal characteristic of the client device 107A as the client device 107A moves about the premises 101. As the client device 107A moves about the premises 101, the analytics engine 116 may determine that, absent the sensor 108 (or any other sensor) being triggered, the client device 107A is never located beyond a certain distance from any of the access points 106A, 106B, or 106C. That is to say, the analytics engine 116 may determine, absent the sensor 108 (or any other sensor) being triggered, the client device 107A exhibits the signal characteristic at a certain minimum value at all times after entering the boundary of the premises. The analytics engine 116 may further determine that, absent the sensor 108 (or any other sensor) being triggered the client device 107A exhibits the signal characteristic at a certain maximum value at all times after entering the boundary of the premises 101. The analytics engine 116 may determine that so long as the client device 107A exhibits the signal characteristic at a value between the maximum and minimum, the client device 107A is inside the boundary of the premises.

The analytics engine 116 may define the boundary of the premises 101 and adjust the coverage area of the wireless network (e.g., the geofence), to fit the boundary of the premises 101 by selectively granting and/or restricting access to the wireless network. For example, the computing device 102 may be configured to restrict access to only those client device (e.g., the client device 107A) located within the boundary of the premises. For example, the computing device 102 may be configured to grant access to the wireless network to only those client devices which exhibit the signal characteristic at a certain value (e.g., an RSSI of a certain strength).

The coverage area of the wireless network (e.g., the geofence) may comprise entrance and exit points. For instance, an entrance point may be associated with the sensor 108. The association between the entrance point and the sensor 108 may be established at initialization or learned over time. The entrance point may be associated with a signal characteristic of a device (e.g., the signal characteristic of the client device 107A). For example, the analytics engine may determine, either at initialization or over time, that the client device 107A exhibits a certain RSSI value at the entrance point associated with the sensor 108. As discussed below, an action may be taken upon determination of the signal characteristic. For example, because the client device 107A historically exhibits a certain RSSI when located at the entrance point associated with the sensor 108, the computing device 102, may, upon determination that the client device 107A is presently exhibiting the RSSI associated with the entrance point, disarm a security system or take some other action as described below.

The computing device 102 may be configured to determine whether a known client device is located inside or outside the premises 101. For example, when the known client device attempts to connect to the wireless network, the known client device may send a signal to the AP (e.g., the access point 106A). The signal may comprise, for example, a probe request. The probe request may comprise an identifier associated with the known client device. The AP 106A may send information related to the signal to the analytics engine 116 which may determine the signal characteristic data. The analytics engine 116 may determine the identifier is associated with the client device signal profile of the known client device. The known client device may be a device associated with the premises 101, for example, a mobile phone owned by an owner of a house. The known client device may be determined based on the identifier contained in the probe quest. The known client device may be associated with the client device signal profile which includes an indication that the known client device is familiar to the wireless network and, for example, authorized to connect to the wireless network. The analytics engine 116 may determine a detected signal characteristic matches the signal characteristic associated with the known client device signal profile. For example, the signal characteristic may comprise an RSSI of −67 dBM at a particular location (e.g., the boundary of the coverage area 110 outside the premises 101), the analytics engine 116 may determine the known client device signal profile comprises the same RSSI and as such, the analytics engine 116 may determine the known client device, at the time of sending the probe request, is located outside the boundary of the home. For example, the detected signal characteristic may comprise an RSSI of −30 dBM at a different location, the analytics engine 116 may determine the known client device signal profile comprises the same RSSI at each of the respective locations and as such, the analytics engine 116 may determine the known client device, at the time of sending the probe request, is located inside the boundary of the premises 101. The analytics engine 116 may use machine learning as described herein to determine the status of the known client device (e.g., inside the boundary of the premises 101 or outside the boundary of the premises 101).

An action may be caused based on determining the status of the known client device. For example, the action may relate to security systems or settings, media content systems or settings, interne connectivity systems or settings, combinations thereof, and the like. For example, if the known client device is determined to have a status inside the premises 101, a message may be sent. Additional actions may be caused based on determining the status of the client device. For example, if the known client device is determined to have a status outside the premises 101, an exterior lighting setting may be implemented. For example, the message may comprise a "disarm" message. The disarm message may be sent, for example, to a security system or a third party security server. The message may be sent to a user device. The message may comprise the device identifier associated with the known client device. The message may comprise an option on a user interface. For example, the message may comprise a disarm option, a trust option, or some similar option which may allow the user to confirm or deny the presence of the known client device and take further action. The aforementioned examples are merely explanatory and are not intended to be limiting. It is to be understood that, upon determining the status of the known client device, any action may be caused. For example, the action may relate to security systems or settings, media content systems or settings, internet connectivity systems or settings, combinations thereof, and the like.

The computing device 102 may be configured to receive and/or determine signal characteristic data associated with an unknown client device. For example, when the unknown client device is determined to be in range of the wireless network or attempts to connect to the wireless network, the unknown client device may transmit a signal to, for example, the access point 106A. The signal may comprise, for example, a probe request. The probe request may comprise an identifier associated with the unknown client device. The access point 106A may send information related to the signal to the analytics engine 116 which may determine the signal characteristic data. The unknown client device may be a device which is not associated with the premises 101, for example, a mobile phone associated with a neighboring premises. The unknown client device may not be associated with a known client device signal profile.

The computing device 102 may be configured to compare the signal characteristic data associated with the unknown device to the client device signal profiles associated with known devices and thus determine a status associated with the unknown client device. Based on the comparison, the computing device 102 may determine if the unknown client device is inside or outside the boundary of the premises 101. For example, if an RSSI associated with the unknown client device matches an RSSI associated with a known client device being inside the boundary of the premises 101, the computing device 102 may determine the unknown client device is within the boundary of the premises 101. The unknown client device may be associated with an unknown client device signal profile which does not include an indication that the unknown client device is familiar to the wireless network (e.g., a client device signal profile which does not match a known client device signal profile) and, for example, is not authorized to connect to the wireless network. The analytics engine 116 may determine the identifier is not associated with the known client device signal profile. The information related to the signal may comprise a signal characteristic associated with the unknown client device. The analytics engine 116 may determine the detected signal characteristic is not associated with the known client device signal profile. For example, the detected signal characteristic may comprise an RSSI of −67 dBM at a particular location, the analytics engine 116 may determine the known client device signal profile comprises a different RSSI at that location and as such, the analytics engine 116 may determine the device which sent the probe request is the unknown client device. However, the analytics engine 116, recognizing the RSSI value of −67 dBm is historically associated with client devices 107A, 107B, 107C located outside the boundary of the premises 101, may determine the unknown device is located outside the boundary of the premises 101. The analytics engine 116 may use machine learning as described herein to determine a status of the device (e.g., inside the boundary or outside the boundary).

An action may be caused based on determining the status of the unknown client device. For example, if the unknown client device is determined to have a status outside the premises 101, an alarm may be initiated or an exterior lighting setting may be implemented. For example, if the unknown client device is determined to have a status inside the premises 101, a message may be sent. For example, the message may comprise an "arm" message. The "arm" message may be sent, for example, to a security system or a third party security server. The message may be sent to the user device. The message may comprise the device identifier associated with the unknown client device. The message may comprise an option. For example, the message may comprise the disarm option, the alarm option, the trust option, or some similar option which may allow the user to confirm or deny the presence of the unknown device and take further action. The aforementioned examples are merely explanatory and are not intended to be limiting. It is to be understood that, upon determining the status of the unknown client device, any action may be caused. For example, the action may relate to security systems or settings, media content systems or settings, internet connectivity systems or settings, combinations thereof, and the like.

Figure 2A:
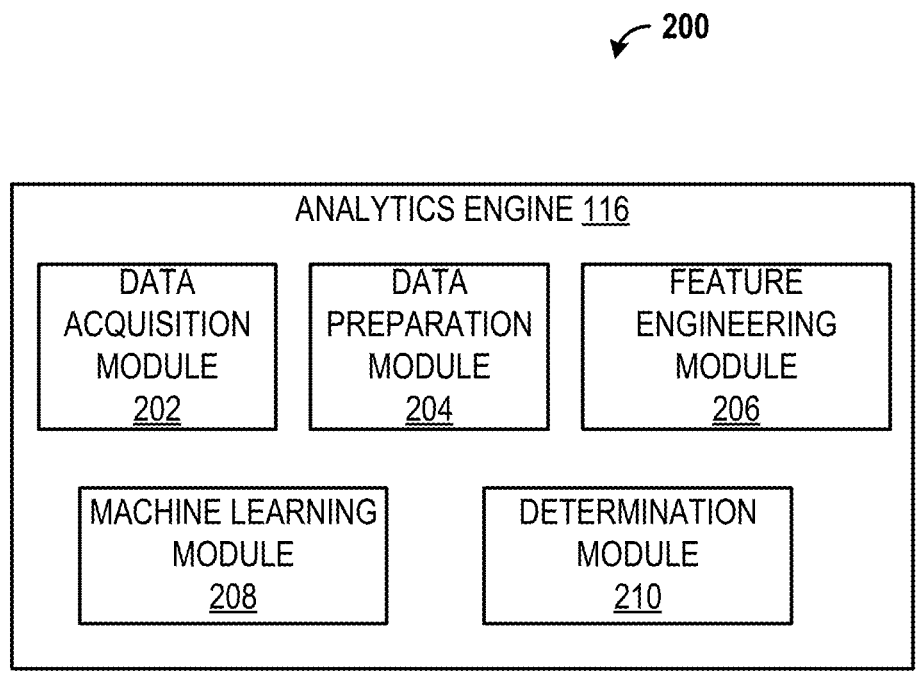
FIG. 2A shows a block diagram of an example system module.

FIG. 2A shows an expanded block diagram of the analytics engine 116 of FIG. 1. The analytics engine 116 may be used to manage or monitor the wireless network at the premises 101 and to monitor signal characteristic data associated with the access points 106A, 106B, 106C, and/or client devices 107A, 107B, 107C. While the following description of the analytics engine 116 may describe only one client device for ease of explanation, it is to be understood that the functionality of the analytics engine 116 and its implementation of the methods described herein may apply to any of the one or more client devices 107A, 107B, 107C in communication with the wireless network, such as each of the client devices 107A, 107B, 107C. The analytics engine 116 may determine the client device signal profile within a coverage area 110 of the wireless network as described herein. The client device signal profile may comprise signal characteristic data collected/aggregated by a data acquisition module 202. The signal characteristic data collected/aggregated by the data acquisition module 202 may require cleaning/preparation in order to make the signal characteristic data more useful for the analytics engine 116.

The analytics engine 116 may include a data preparation module 204 that may be configured for initial cleaning of the signal characteristic data and for generating intermediate data staging and temporary tables in a database of the data preparation module 204. For example, the data preparation module 204 may clean the signal characteristic data by removing duplicate records in the database for a given client device (e.g., the client device 107A), a given AP (e.g., the access point 106A), and/or the wireless network when multiple entries for the client device 107A, AP 106A, and/or the wireless network are present in the signal characteristic data. The data preparation module 204 may also eliminate any values of signal characteristics (e.g., based on a signal characteristic(s)) that are present within the signal characteristic data less than a threshold amount of times). For example, values of signal characteristics having ten or fewer occurrences within the signal characteristic data may not contribute significantly towards assisting with a determination option as to whether or not a given device is inside or outside of the boundary of the premises 101. For example, the data preparation module 204 may divide the signal characteristic data into multiple subsets based on a respective identifier or signal characteristic for each of the one or more client devices 107A, 107B, 107C and/or each of the one or more APs 106A, 106B, 106C. The data preparation module 204 may store each subset in a different table in the database.

The data preparation module 204 may standardize the signal characteristic data. For example, one or more of the subsets of the signal characteristic data may include signal characteristic data in a first format or structure while one or more other subsets of the signal characteristic data may include data in another format or structure. The data preparation module 204 may standardize the signal characteristic data by converting all data of all subsets of the signal characteristic data into a common format/structure.

The data preparation module 204 may determine one or more values of the signal characteristics based on the signal characteristic data. For example, the data preparation module 204 may determine the one or more values of the signal characteristics based on a signal characteristic for the one or more client devices 107A, 107B, 107C of the wireless network during a given time interval. The signal characteristic values may include one or more derived values associated with one or more signal characteristics associated with, for example the client 107A or the access point 106A. For example, a derived value of the one or more derived values may be an average level of signal strength for the client device 107A during a plurality of time intervals. For example, the derived value may be an indication of how a level of signal strength for the client device 107A for a given time interval deviates from an average level of signal strength for the client device 107A during the plurality of time intervals (e.g., a standard deviation). An example of the derived value may be a measure of a symmetry of a distribution of signal strengths for the client device 107A or access point 106A during each of the plurality of time intervals with respect to the average level of signal strength for the client device 107A or the access point 106A during the plurality of time intervals (e.g., a skewness).

The analytics engine 116 may include a feature engineering module 206 that may be configured to prepare signal characteristic data for input into a machine learning module 208 of the analytics engine 116. For example, the feature engineering module 206 may generate a data point for each client device 107A, 107B, 107C of the wireless network using corresponding signal characteristic data. A given data point for a given client device (e.g., the client device 107A) or access point (e.g., the access point 106A) may be referred to as a "vector" of signal characteristic data that represents all relevant signal characteristic values for the client device 107A or the access point 106A. The feature engineering module 206 may be configured to perform feature engineering as part of generating the one or more machine learning models by the machine learning module 208. The feature engineering module 206 may generate new independent variables/features or modify existing features that can improve a determination of a target variable (e.g., whether the client device 107A is likely within the boundary of the premises 101). The feature engineering module 206 may eliminate feature values that do not have significant effect on the target variable. That is, the feature engineering module 206 may eliminate feature values that do not have significant effect when determining whether the client device 107A is likely within the boundary of the premises 101. For example, the signal characteristic data may be analyzed according to additional feature selection techniques to determine one or more independent variables/features that have a significant effect when determining whether the client device 107A is likely within the boundary of the premises 101. Any suitable computational technique may be used to identify the one or more independent variables/features using any feature selection technique such as filter, wrapper, and/or embedded methods. For example, the one or more independent variables/features may be selected according to a filter method, such as Pearson's correlation, linear discriminant analysis, analysis of variance (ANOVA), chi-square, combinations thereof, and the like. For example, the one or more independent variables/features may be selected according to a wrapper method configured to use a subset of features and train a machine learning model using the subset of features. Based on inferences that may be drawn from a previous model, features may be added and/or deleted from the subset. Wrapper methods include, for example, forward feature selection, backward feature elimination, recursive feature elimination, combinations thereof, and the like. For example, the one or more independent variables/features may be selected according to an embedded method that may combine the qualities of the filter and wrapper methods. Embedded methods include, for example, Least Absolute Shrinkage and Selection Operator (LASSO) and ridge regression which implement penalization functions to reduce overfitting.

The feature engineering module 206 may also group and categorize each of the access points 106A, 106B, 106C or the client devices 107A, 107B, 107C, for instance as being inside or outside the boundary of the premises. For example, mobile client devices, such as laptops, mobile phones, etc., may be associated with signal characteristic data that vary greatly throughout a plurality of time intervals (e.g., based on movement of the mobile client devices with respect to, for example, access point 106A) and at times indicate the client devices 107A, 107B, 107C are inside or outside the boundary of the premises. In contrast, stationary client devices, such as desktops, smart speakers, etc., may be associated with signal characteristic values that do not vary greatly throughout a plurality of time intervals and thus are consistently grouped as being inside the boundary of the premises.

A machine learning module 208 may be configured to generate one or more machine learning models to manage and/or monitor the wireless network, access points 106A, 106B, 106C, and/or client devices 107A, 107B, 107C. For example, a first machine learning model may be a binary classifier that indicates whether a given client device (e.g., the client device 107A) is within the boundary of the premises 101. For example, a second machine learning model may be an unsupervised model (e.g., no dependent variables/labels are used). The second machine learning model may be used to determine whether the client device 107A of the wireless network is likely inside the boundary of a premises 101 or outside the boundary of the premises 101. The second machine learning model may provide a prediction of whether the client device 107A is inside the boundary of the premises 101 or outside the boundary of the premises. The prediction may range between 0 and 1. A value of '1' may indicate the client device 107A is likely inside the boundary of the premises 101, while a value of '0' may indicate the client device 107A is likely outside the boundary of the premises. The machine learning model may include parameters, such as a plurality of signal characteristic values that are optimized by the machine learning module 208 for maximizing a function associated with the machine learning model given the signal characteristic data. For example, in the context of classification (e.g., determining whether the client device 107A is inside or outside the boundary of the premises 101), the machine learning model may be visualized as a straight line that separates the signal characteristic data into two classes (e.g., labels indicating "inside" or "outside"). The function may consider a number of misclassified points of signal characteristic data. The misclassified points may be a plurality of data points (e.g., one or more signal characteristic values) that the machine learning model incorrectly classifies as not being inside or outside the boundary of the premises 101. A learning process of the machine learning model may be employed by the machine learning module 208 to adjust coefficient values for the parameters such that the number of misclassified points is minimal. After this optimization phase (e.g., learning phase), the machine learning model may be used to classify new data points.

The machine learning module 208 may employ one or more machine learning algorithms such as, but not limited to, a nearest neighbor (NN) algorithm (e.g., k-NN models, replicator NN models, etc.); statistical algorithm (e.g., Bayesian networks, etc.); clustering algorithm (e.g., k-means, mean-shift, etc.); neural networks (e.g., reservoir networks, artificial neural networks, etc.); support vector machines (SVMs); logistic or other regression algorithms; Markov models or chains; principal component analysis (PCA) (e.g., for linear models); multi-layer perceptron (MLP) ANNs (e.g., for non-linear models); replicating reservoir networks (e.g., for non-linear models, typically for time series); random forest classification; a combination thereof and/or the like.

The machine learning module 208 may include any number of machine learning models to perform the techniques herein, such as for cognitive analytics, predictive analysis, and/or trending analytics as known in the art. The machine learning module 208 may take empirical data as an input and recognize patterns within the data. As an example, the empirical data may be signal characteristics or signal characteristic data for the wireless network, any of the access points 106A, 106B, 106C or the client devices 107A, 107B, 107C. The signal characteristic data may include a plurality of signal characteristic values determined by the feature engineering module 206. For example, the values may be aggregated measures from client devices 107A, 107B, 107C of the wireless network. The machine learning module 208 may employ one or more supervised, unsupervised, or semi-supervised machine learning models. Generally, supervised learning entails the use of a training set of data as discussed herein that may be used to train the machine learning model to apply labels to the input data. For example, the training data may include signal characteristic data containing a plurality of data points (e.g., signal characteristic values) that may be associated with labels indicating whether a device is inside the boundary of the premises 101 or outside the boundary of the premises 101. Unsupervised techniques, on the other hand, do not require a training set of labels. While a supervised machine learning model may determine whether previously seen patterns in a training dataset have been correctly labeled in a testing dataset, an unsupervised model may instead determine whether there are sudden changes in values of the plurality of data points. Semi-supervised machine learning models take a middle ground approach that uses a greatly reduced set of labeled training data as known in the art.

As discussed herein, the machine learning module 208 may be configured to train a classifier of a machine learning model(s) that may be used to classify whether a signal characteristic value is indicative of, for example, the client device 107A being inside the boundary of the premises 101 or outside the boundary of the premises 101. The machine learning module 208 may receive a training dataset that includes wireless network signal characteristic data for one or more client devices 107A, 107B, 107C connected to the wireless network to be used to train the classifier. When training the classifier, the machine learning module 208 may evaluate several machine learning algorithms using various statistical techniques such as, for example, accuracy, precision, recall, F1-score, confusion matrix, receiver operating characteristic ("ROC") curve, and/or the like. The machine learning module 208 may also use a Random Forest algorithm, a Gradient Boosting algorithm, an Adaptive Boosting algorithm, K-Nearest Neighbors algorithm, a Naïve Bayes algorithm, a Logistic Regressor Classifier, a Support Vector machine, a combination thereof and/or the like when training the classifier. Gradient Boosting may add predictors to an ensemble classifier (e.g., a combination of two or more machine learning models/classifiers) in sequence to correct each preceding prediction (e.g., by determining residual errors). The K-Nearest Neighbors algorithm may receive each data point within the signal characteristic data and compare each to the "k" closest data points. The AdaBoost Classifier may attempt to correct a preceding classifier's predictions by adjusting associated weights at each iteration. The Support Vector Machine may plot data points within the signal characteristic data in n-dimensional space and identify a best hyperplane that separates the signal characteristic values indicated by the signal characteristic data into two groups (e.g., meeting the signal characteristic threshold vs. not meeting the signal characteristic threshold). Logistic Regression may be used to identify an equation that may estimate a probability of, for example, the client device 107A being within the boundary of the premises 101 as a function of a feature vector of signal characteristic values. Gaussian Naïve Bayes may be used to determine a boundary between the two groups of performance values based on Bayesian conditional probability theorem. A Random Forest Classifier may comprise a collection of decision trees that are generated randomly using random data sampling and random branch splitting (e.g., in every tree in the random forest), and a voting mechanism and/or averaging of outputs from each of the trees may be used to determine whether a signal characteristic value meets or does not meet the signal characteristic threshold.

The machine learning module 208 may select one or more machine learning models to generate an ensemble classifier (e.g., an ensemble of one or more classifiers). Selection of the one or more machine learning models may be based on each respective models' F1-score, precision, recall, accuracy, and/or confusion values (e.g., minimal false positives/negatives). For example, the ensemble classifier may use Random Forest, Gradient Boosting Machine, Adaptive Boosting, Logistic Regression, and Naïve Bayes models. The machine learning module 208 may use a logistic regression algorithm as a meta-classifier. The meta-classifier may use respective predictions of each model of the ensemble classifier as its features to make a separate determination of whether a signal characteristic value meets or does not meet the signal characteristic threshold.

The machine learning module 208 may train the ensemble classifier based on the training dataset. For example, the machine learning module 208 may train the ensemble classifier to predict results for each of the multiple combinations of signal characteristic values within the training dataset. The predicted results may include soft predictions, such as one or more predicted results, and a corresponding likelihood of each being correct. For example, a soft prediction may include a value between 0 and 1 that indicates a likelihood of, for example, the client device 107A being within the boundary of the premises 101, with a value of 1 being a prediction with 100% accuracy that the client device 107A is within the boundary of the premises 101, and a value of 0.5 corresponding to a 50% likelihood that the client device 107A is within the boundary of the premises 101 and a value of 0 corresponding to a 0% likelihood the client device 107A is inside the boundary of the premises. The machine learning module 208 may make the predictions based on applying the features engineered by the feature engineering module 206 to each of the multiple combinations of signal characteristic values within the training dataset.

The meta-classifier may be trained using the predicted results from the ensemble classifier along with the corresponding combinations of signal characteristic values within the training dataset. For example, the meta-classifier may be provided with each set of the signal characteristic values and the corresponding prediction from the ensemble classifier. The meta-classifier may be trained using the prediction from each classifier that is part of the ensemble classifier along with the corresponding combinations of values.

The meta-classifier may be trained to output improved predictions that are based on the resulting predictions of each classifier of the ensemble classifier based on the same values. The meta-classifier may then receive a testing dataset that includes signal characteristic data and signal characteristic values for a testing set of wireless networks, and the meta-classifier may predict whether, for example, the client device 107A is within the boundary of the premises 101 based on the signal characteristic values indicated by the signal characteristic data of the testing dataset. The meta-classifier may receive input, over time, from a user. The prediction by the meta-classifier that is based on the ensemble classifier may include one or more predicted results along with a likelihood of accuracy of each prediction.

For example, the machine learning module 208 may implement one or more unsupervised machine learning techniques that may not require a training set of labels. That is, the machine learning module 208 may determine whether there are sudden changes in values of the one or more signal characteristic values (e.g., RSSI). If a signal characteristic value associated with the client device 107A meets or exceeds the signal characteristic threshold, then the machine learning module 208 may determine that the signal characteristic value is indicative of, for example, the client device 107A being inside the boundary of a premises 101. However, if the signal characteristic value of the client device 107A does not meet or exceed the signal characteristic threshold, then the machine learning module 208 may determine that the signal characteristic value is indicative of the client device 107A being outside of the boundary of the premises 101 (e.g., the RSSI is low). The analytics engine 116 may determine whether the client device 107A is moving or stationary by determining, over time, whether the RSSI is increasing or decreasing or static.

Performance of the machine learning module 208 may be evaluated in a number of ways based on a number of true positives, false positives, true negatives, and/or false negatives classifications of the plurality of data points indicated by the machine learning model. For example, the false positives of the machine learning model may refer to a number of times the model incorrectly classified the client device 107A as inside or outside the boundary of premises 101. For example, the false positives of the machine learning model may refer to a number of times the model incorrectly classified one or more signal characteristic values as not meeting or exceeding a signal characteristic threshold (e.g., a threshold RSSI value associated with the client device 107A being located inside or outside the boundary of the premises 101). Conversely, the false negatives of the machine learning model may refer to a number of times the machine learning model classified one or more signal characteristic values as meeting or exceeding the signal characteristic threshold when, in fact, the one or more signal characteristic values did not meet or exceed the signal characteristic threshold. True negatives and true positives may refer to a number of times the machine learning model correctly classified the one or more signal characteristic values with respect to meeting, or not meeting, the signal characteristic threshold, respectively. A user may compliment the machine learning by identifying false or true positive as well as false or true negatives. Related to these measurements are the concepts of recall and precision. Generally, recall refers to a ratio of true positives to a sum of true positives and false negatives, which quantifies a sensitivity of the machine learning model. Similarly, precision refers to a ratio of true positives a sum of true and false positives.

Figure 2B:
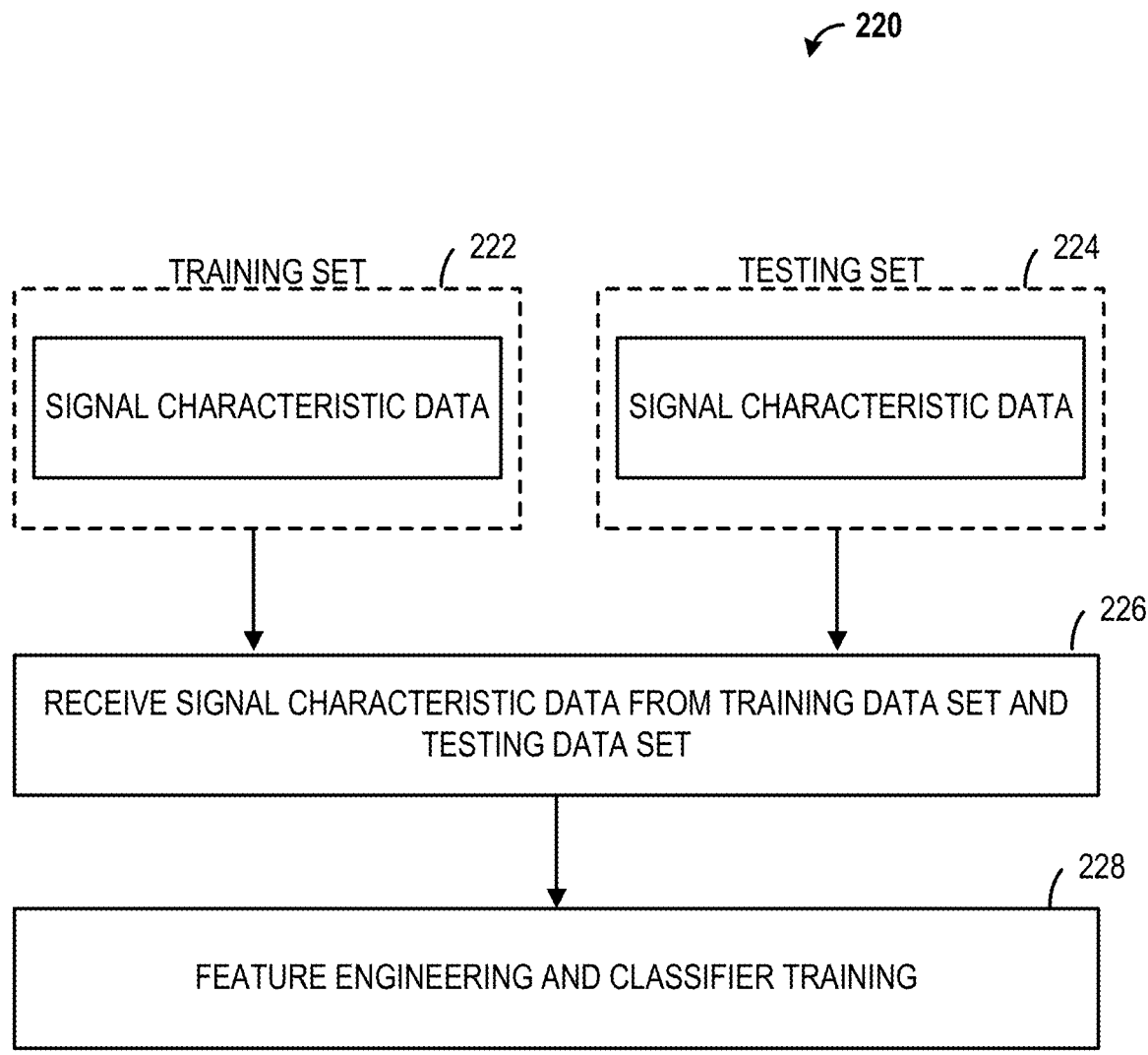
FIG. 2B shows an example training method.

Turning to FIG. 2B, an example training process 220 for a machine learning classifier is shown. The analytics engine 116 may implement the training process 220 in training the classifier. A training dataset 222 may include signal characteristic data for one or more access points 106A, 106B, 106C or one or more client devices 107A, 107B, 107C connected to the wireless network. The signal characteristic data may be associated with the one or more client devices 107A, 107B, 107C. The signal characteristic data may be associated with the one or more the access points 106A, 106B, 106C. A testing dataset 224 may include signal characteristic data for the one or more access points 106A, 106B, 106C or the one or more client devices 107A, 107B, 107C connected to the wireless network.

At step 226, the analytics engine 116 may receive signal characteristic data for each of the training data set and the testing data set. At step 228, the classifier is trained by the machine learning module 208 using one or more of the machine learning models and/or techniques discussed herein (e.g., a binary classifier) applied to the signal characteristic data received at step 226 and the training dataset 222. The machine learning module 208 may determine one or more signal characteristic values within the signal characteristic data received at step 222. The one or more signal characteristic values may then be used to train the classifier to determine whether, for example the client device 107A is likely present within the boundary of the premises 101. For example, the machine learning module 208 may determine that the one or more signal characteristic values for the client device 107A satisfies a probability threshold indicating the client device is likely within the boundary of a premises 101.

Figure 3:
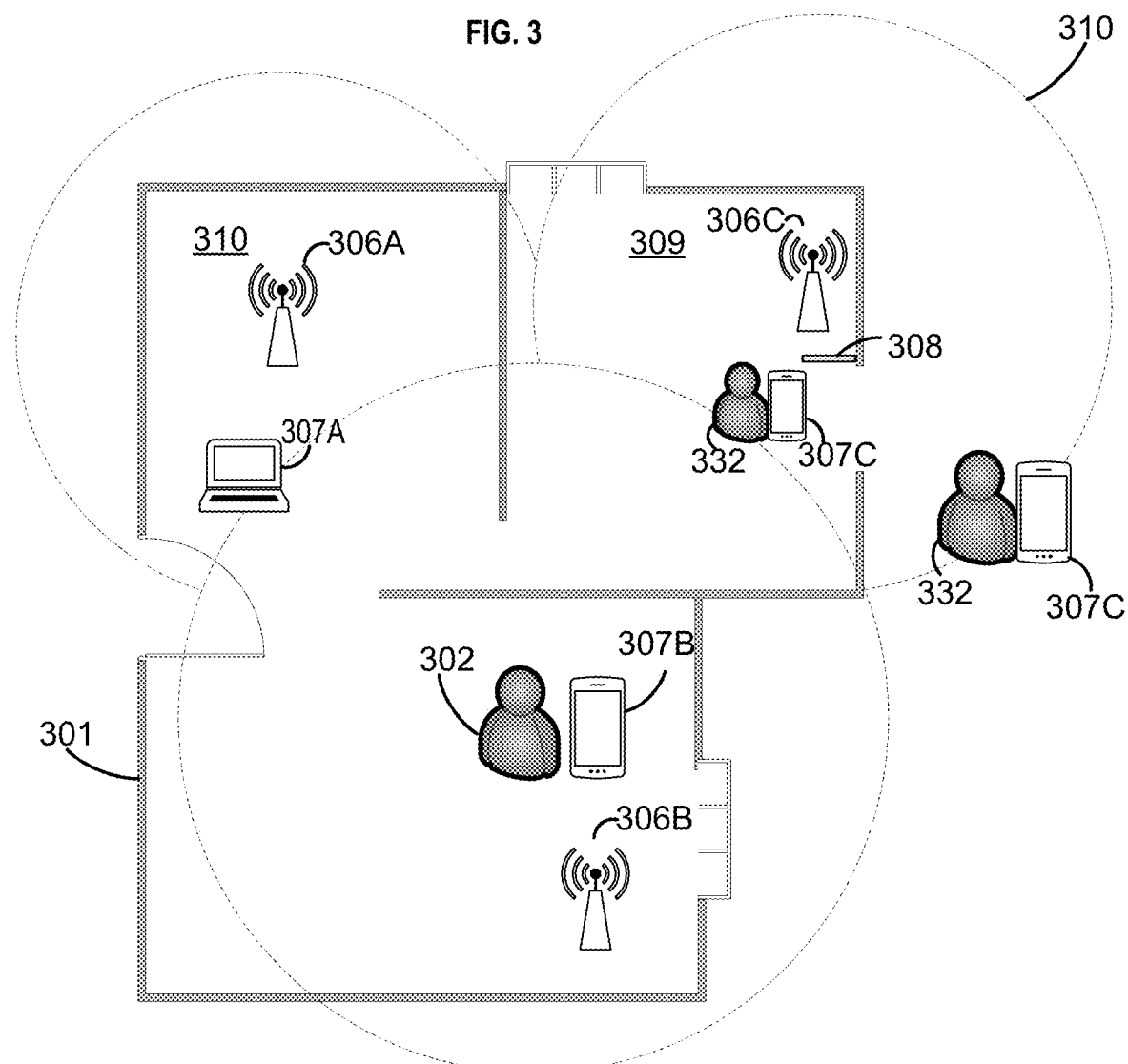
FIG. 3 shows an example operating environment.

FIG. 3 shows an example operating environment 300 in which the methods and systems described herein may operate. The operating environment 300 may incorporate any of the devices or networks described in FIG. 1. The operating environment 300 may comprise a premises 301. The premises 301 may be, for example, the premises 101. The operating environment may comprise one or more access points 306A, 306B, 306C (e.g., access points 106A, 106B, 106C). The one or more access points 306A, 306B, 306C may provide network connectivity for a wireless network for one or more client devices 307A, 307B, 307C (e.g., the client devices 107A, 107B, 107C). The wireless network may have a coverage area 310. The operating environment 300 may comprise a sensor 308 (e.g., the sensor 108). In an aspect, the client device 307C may send a probe request to the access point 306C. The probe request may be received by the access point 306C. The probe request may comprise signal characteristics. Based on the signal characteristics, the access point 306C may determine signal characteristic data (e.g., a value associated with an RSSI associated with the probe request). The access point 306C may send the signal characteristic data to a computing device (e.g., the computing device 102). The probe request may be received at a first time and the signal characteristic may be associated with the first time. At a second time, based on, for example, another signal sent from the client device 307C and received by the access point 306C, a new value of the RSSI of may be determined. For example, it may be determined that the RSSI associated with the signal from the client device 307C has increased. As such, the computing device 102 may determine the client device 307C is approaching access point 306C and, by extension, the premises 301. At a third time, the sensor 308 may be triggered. The sensor 308 may comprise any sensor such as the sensor 108 and function similarly to the sensor 108 as described herein. Based on the sensor 308 being triggered, an indication may be sent, for example by the sensor 308, to the computing device 102. The indication may comprise information such as timing information (e.g., a timestamp or date) and/or location information (e.g., that sensor 308 is associated with a particular door). Based on receiving the indication, the computing device 102 may determine the signal characteristic associated with the signal from the client device 307C. It may be determined that, when the client device 307C is located proximate the sensor 308, the signal (e.g., the probe request) sent from the client device 307C is associated with a particular RSSI. As such, the computing device 102 may use this information to determine a client device signal profile associated with the client device 307C. The computing device 102 may store the client device signal profile.

FIG. 4A shows an example client device signal profile 400 for the client device 307A as the client device 307A moves about the premises 301. The client device signal profile 400 may comprise fields populated with data associated with the client device 307A such as signal characteristic data as described above, an identifier (e.g., a device identifier), information related to location or other spatial information, information related to time or other temporal information, information related to a signal characteristic (e.g., RSSI or some other signal characteristic), notes, combinations thereof, and the like. For example, FIG. 4A shows that at time 07:00:00, the client device 307A sent a signal to the access point 306A and the access point 306A registered an RSSI of −20 dBm. The analytics engine 116 may determine that the RSSI of −20 dBm matches a client device signal profile comprising a location within the boundary of the premises 301. Likewise, at 11:12:00, the access point 306A received a signal from the client device 307A with an RSSI of −37 dBm, indicating the mobile device 307A is within the boundary of the premises 301. At time 16:40:00, however, the access point 306A received a signal from the client device 307A with an RSSI of −67 dBm and simultaneously the sensor 308 was triggered. The analytics engine 116 may determine that the client device 307A is now located outside the boundary of the premises 301. Likewise, at time 16:41:00, the mobile device 107B is associated with an RSSI of −80 dBm, indicating the client device 307A is moving away from the boundary of the premises 301.

FIG. 4B shows an example client device signal profile 402 associated with the client device 307C as the client device moves about the premises 301. The client device signal profile 402 may comprise fields populated with data associated with the client device 307C such as signal characteristic data as described above, an identifier (e.g., a device identifier), information related to location or other spatial information, information related to time or other temporal information, information related to a signal characteristic (e.g., RSSI or some other signal characteristic), and notes. For example, at time 08:15:30, the access point 306C received from the client device 307C a signal with an RSSI of −80 dBm. This value may be compared to a known client device signal profile to determine if that RSSI is associated with a location inside the premises 301 or outside the premises 301. Likewise, at 08:15:35, the access point 306C received a signal from the client device 307C having an −67 dBm. This value may be compared to the known client device profile to determine the −67 dBm is associated with a signal sent to the access point 306C from a location at the boundary of the premises 301 or outside the boundary of the premises 301. Also at time 08:15:35, the sensor 308 was triggered. The sensor 308 may send to the computing device 102 an indication that the sensor 308 was triggered. Based on the indication and changing RSSI values associated with the signal received by the access point 306C from the client device 307C, the computing device 102 may determine the client device 307C is entering the boundary of the premises. This may be done by, for example, determining the RSSI of the signal received by the access point 306C from the client device 307C at times before and after the sensor 308 is triggered (e.g., 08:15:30 and 08:16:00).

FIG. 5 shows an example table 500 of a plurality of signal characteristic values which may make up part of the client device signal profile. The table may include a first column indicating a name associated signal characteristics and a corresponding coefficient for each value as shown in a second column. The coefficient for the value may indicate a relative weight of importance of the value with respect to its impact on a signal profile.

Figure 6:
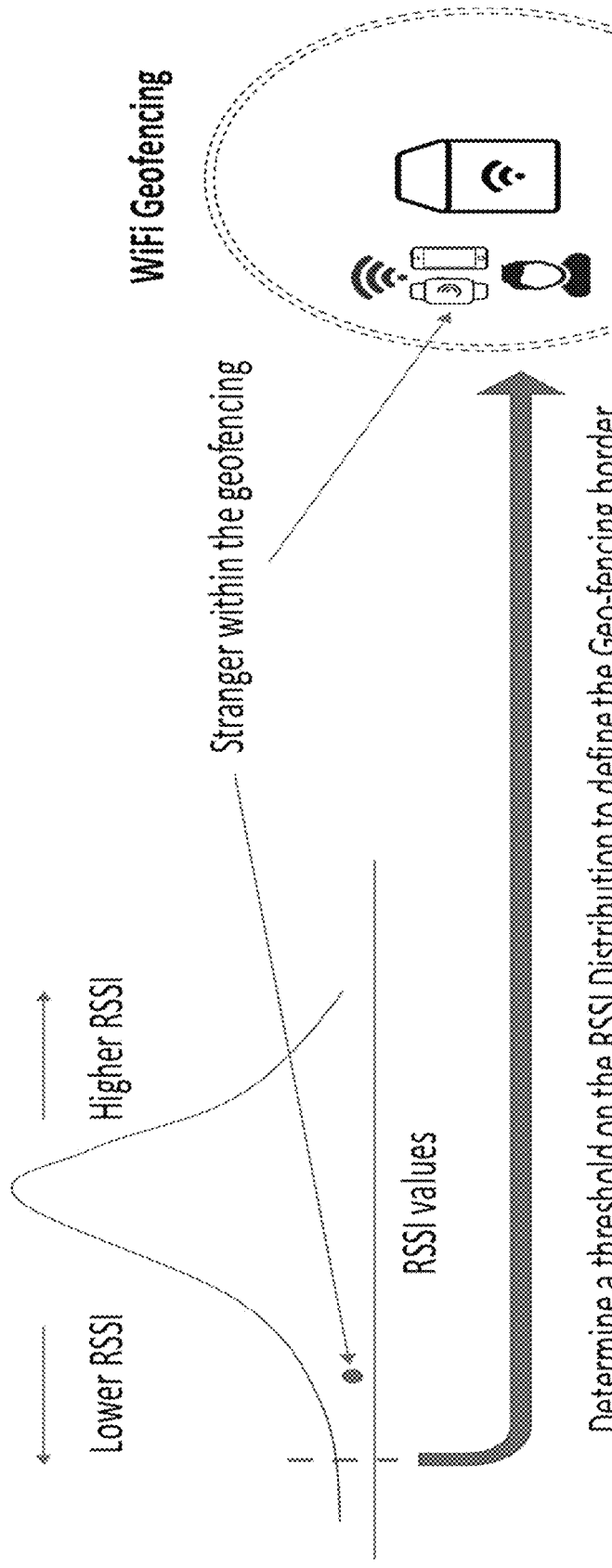
FIG. 6 shows an example signal distribution.

FIG. 6 shows an example of a signal profile with thresholds. A signal characteristic value may relate to a level of skewness of a distribution of values of the level of RSSI for, for example, the client device 107A, during each of a plurality of time intervals of the day. The level of skewness may be a measure of a symmetry of the distribution of the values of the level of RSSI for the client device 107A during each of the plurality of time intervals of the day with respect to the mean RSSI for the client device 107A during the day. When the level of skewness is determined to be at least a specified level of skewness (e.g., less than −0.4 or greater than 0.4), the level of RSSI for that time interval may be considered to fall below (e.g., not meeting or exceeding) the signal characteristic threshold.

Figure 7A:
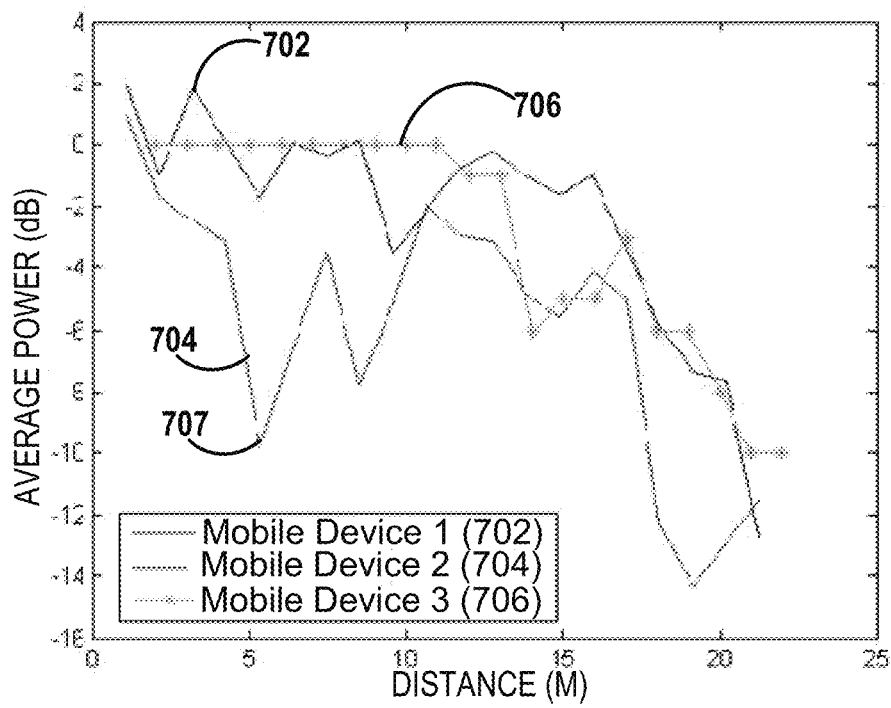
FIG. 7A shows an example graphic of a signal characteristic.

FIG. 7A shows an example graphical representation of average signal power versus distance 700. The graphical representation of average signal power versus distance 700 comprises an RSSI strength over distance from an access point (e.g., the access point 106A) for a first client device 702, a second client device 704, and a third client device 706 (e.g., any of client devices 107A, 107B, 107C). As can be seen from the non-linear data associated with the first, second, and third client devices, irregularities in RSSI may be impacted by a wall or some other physical obstacle between the mobile device and the AP. An example is at point 707, where the RSSI falls before 5 meters and rises again after 5 meters. The simulated RSSI strength over distance with doors open 702 and the simulated RSSI strength over distance with doors closed 704 may be part of the training dataset to which the measured RSSI strength over distance 406 may compared so as to determine the status of any of the client devices 702, 704, 706.

Figure 7B:
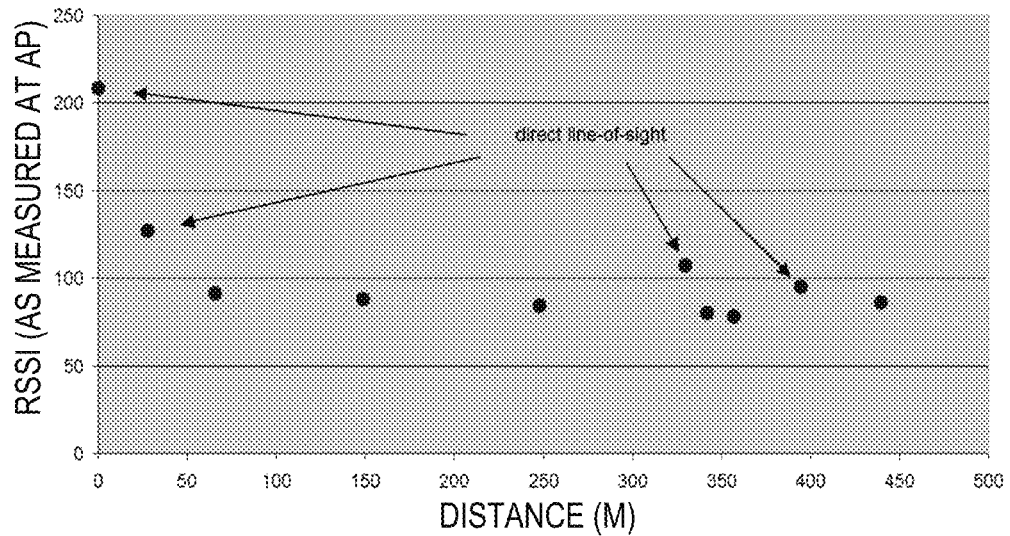
FIG. 7B shows an example graphic if a signal characteristic.

FIG. 7B shows an example graphical representation of measured RSSI versus distance 708. The example graphical representation of measured RSSI versus distance 708 may comprise a reading of RSSI over distance from, for example, the access point 106A. At least one determination may be made as to the RSSI when, for example, the client device 107A has a direct line of sight to the access point 106A as compared to when the client device 107A does not have a direct line of sight to the base station 106A. For example, it may be determined that a wall between the client device 107A and the access point 106A may impact the RSSI value.

FIG. 8 shows an example method 800. The method 800 may be implemented by any suitable computing device such as the computing device 102, the analytics engine 116, the sensor 108, the access points 106A, 106B, 106C, the client devices 107A, 107B, 107C, or any other devices described herein. At step 810, data may be received. The data may be associated with one or more sensors located proximate a premises. The premises may comprise a building or structure such as a house or an office building. The data may be associated with one or more entry points or exit points of the premises. For example, the one or more sensors may be located at an entry point or exit point of the premises. The data associated with the one or more sensors located at the entry point or exit point of the premises may comprise an indication that a door or window has been opened or broken. For example, the entry point or exit point may comprise a door or window. The one or more sensors may comprise any sensor as described herein. The data associated with the one or more sensors may be received from the one or more sensors by the computing device. For example, the data may be sent by the one or more sensors to an access point and relayed to the computing device.

At 820, signal characteristic data associated with one or more client devices may be determined. The signal characteristic data associated with the one or more client devices may be determined at a time at which the one or more client devices are proximate the one or more sensors. The computing device may determine the signal characteristic data associated with the one or more client devices when it receives the data from the one or more sensors associated with the entry point or exit point. For example, the one or more client devices may send, and the access point may receive, a probe request. The access point may relay information associated with the probe request to the computing device. The information associated with the probe request may comprise an identifier and signal characteristic data. The identifier may comprise a MAC address associated with the one or more client devices. The signal characteristic data may comprise data related to a signal strength, a transmission power, a connection status, channel information, an authentication status, an authorization status, network traffic, a signal to noise ratio, a data throughput, a bit error rate, a packet error rate, a packet retransmission rate, a transmission power, a received signal strength indicator (RSSI), a time of flight, a frequency, an amplitude, a data traffic characteristic, an interference metric, combinations thereof, and the like.

At step 830, a boundary of the premises may be determined. The boundary of the premises may be determined based on the signal characteristic data associated with the one or more client devices. For example, the signal characteristic data may comprise an RSSI of a particular client device at the entry point or exit point of the premises. For example, the signal characteristic data of the client device may comprise an RSSI of −30 dBm at a front door of the premises and an RSSI of −67 dBm at a back door of the premises. Such information may be determined upon installation or learned dynamically over time through the machine learning techniques described herein. The signal characteristic data associated with the one or more client devices may comprise a previously known RSSI value of −80 dBm when the client device is located outside the boundary of the premises, and an RSSI of −67 dBm or greater at all times the client device is located inside the boundary of the premises.

At step 840, a position of the one or more client devices may be determined. For example, a position of an authorized client device of the one or more client devices may be determined. For example, the MAC address associated with the probe request may indicate to the analytics engine that the probe request came from an authorized client device (e.g., a device which is allowed to be within the boundary of the premises). Whether or not a client device of the one or more client devices is an authorized client device may be determined at initialization or learned over time. The signal characteristic data may be associated with the authorized client device. For example, the signal characteristic data may comprise data stored in a signal characteristic data profile associated with the authorized client device which may be established at initialization or learned over time. For example, the analytics engine may compare the signal characteristic data with the signal characteristic data profile. The position of the authorized client device may be in relation to the boundary of the premises. For example, the signal characteristic data may indicate that the authorized client device is located within the boundary of the premises. For example, the signal characteristic data associated with the one or more client devices may comprise an RSSI of −30 dBm at a front door of the premises and an RSSI of −67 dBm at a back door of the premises. Such information may be determined upon installation or learned dynamically over time through the machine learning techniques described herein. The client device signal profile of the client device may comprise a previously known RSSI value of −80 dBm when the client device is located outside the boundary of the premises, and an RSSI of −67 dBm or greater at all times the client device is located inside the boundary of the premises.

At step 850, a service may be provided to the authorized client device. The service may be any type of service. For example, the service may comprise a network service such as connectivity to the network. The service may comprise an application such as the activation of a mobile app. The service may be provided to the authorized client device based on the position of the authorized client device relative to the boundary of the premises. For example, the service may not be provided to the authorized client device but for the authorized client device being located inside the boundary of the premises. The aforementioned is not meant to limiting. In other examples, the service may be provided to the authorized client device even if the authorized client device is located outside the boundary of the premises.

The method 800 may further comprise determining a user profile associated with the authorized client device. The user profile may be determined based on the signal characteristic data associated with the authorized client device. For instance, the MAC address in the probe request may be associated with an identifier in the user profile. For example, the signal characteristic data may match the signal characteristic data profile associated with the authorized client device. The user profile may comprise various services or settings. For example, the user profile may comprise network credentials such as a username and password, financial information, lighting or audio settings, combinations thereof, and the like.

The above method may be executed by any suitable computing device described herein, such as the computing device 102 comprising the analytics engine 116.

FIG. 9 shows an example method 900. The method 900 may be implemented by any suitable computing device such as the computing device 102, the analytics engine 116, the sensor 108, the access points 106A, 106B, 106C, the client devices 107A, 107B, 107C, or any other devices described herein. At step 910 data may be received. The data may be associated with the one or more sensors located proximate a premises. The premises may comprise a building or structure such as a house or an office building. The data may be associated with one or more entry points or exit points of the premises. For example, the one or more sensors may be located at an entry point or exit point of the premises. The data associated with the one or more sensors located at the entry point or exit point of the premises may comprise an indication that a door or window has been opened or broken. For example, the entry point or exit point may comprise a door or window. The one or more sensors may comprise any sensor as described herein. The data associated with the one or more sensors may be received from the one or more sensors by the computing device (e.g., the computing device 102). For example, the data may be sent by the one or more sensors to an access point and relayed to the computing device.

At 920, signal characteristic data associated with one or more client devices may be determined. The signal characteristic data associated with the one or more client devices may be determined at a time at which the one or more client devices are proximate the one or more sensors. The computing device may determine the signal characteristic data associated with the one or more client devices when it receives the data from the one or more sensors associated with the entry point or exit point. For example, the one or more client devices may send, and the access point may receive, a probe request. The access point may relay information associated with the probe request to the computing device. The information associated with the probe request may comprise an identifier and signal characteristic data. The identifier may comprise a MAC address associated with the one or more client devices. The signal characteristic data may comprise data related to a signal strength, a transmission power, a connection status, channel information, an authentication status, an authorization status, network traffic, a signal to noise ratio, a data throughput, a bit error rate, a packet error rate, a packet retransmission rate, a transmission power, a received signal strength indicator (RSSI), a time of flight, a frequency, an amplitude, a data traffic characteristic, an interference metric, combinations thereof, and the like.

At step 930, a boundary of the premises may be determined. The boundary of the premises may be determined based on the signal characteristic data associated with the one or more client devices. For example, the signal characteristic data may comprise an RSSI of the one or more client device at an entryway into a premises. For example, the signal characteristic data of the one or more client devices may comprise an RSSI of −30 dBm at a front door of the premises and an RSSI of −67 dBm at a back door of the premises. Such information may be determined upon installation or learned dynamically over time through the machine learning techniques described herein. The signal characteristic data associated with the one or more client devices may comprise a previously known RSSI value of −80 dBm when the one or more client devices is located outside the boundary of the premises, and an RSSI of −67 dBm or greater at all times the one or more client device is located inside the boundary of the premises. The boundary may be determined by the analytics engine 116.

At step 940, a position of the one or more client devices relative to the boundary may be determined. For example, a position of an unauthorized client device of the one or more client devices may be determined. For example, the MAC address associated with the probe request may indicate to the computing device that the probe request came from an unauthorized client device (e.g., a device which is not allowed to be within the boundary of the premises). For example, the probe request may contain a MAC address which is not familiar to the computing device. The position of the unauthorized client device may be in relation to the boundary of the premises. For example, the signal characteristic data may indicate that the unauthorized client device is located within the boundary of the premises. For example, the analytics engine may compare the signal characteristic data with a signal characteristic data profile. For example, the signal characteristic data associated with the one or more authorized client devices may comprise an RSSI of −30 dBm at a front door of the premises and an RSSI of −67 dBm at a back door of the premises. For example, such information may be learned dynamically over time through the machine learning techniques described herein.

At step 950, a security action may be caused. The security action may comprise a network security action (e.g., denying the unauthorized client device access to the network), a home security action (e.g., triggering a home security alarm), combinations thereof, and the like. The security action may be caused based on the position of the unauthorized client device relative to the boundary. For example, the analytics engine may determine the unauthorized client device is within the boundary of the premises and trigger a home security alarm.

FIG. 10 shows an example method 1000. The method 1000 may be implemented by any suitable computing device such as the computing device 102, the analytics engine 116, the sensor 108, the access points 106A, 106B, 106C, the client devices 107A, 107B, 107C, or any other devices described herein.

At step 1010, data may be received. The data may be associated with the one or more sensors located proximate a premises. For example, the one or more sensors may be located at an entry or exit point of the premises. The data associated with the one or more sensors located at the entry point or exit point of the premises may comprise an indication that a door or window has been opened or broken. For example, the entry point or exit point may comprise a door or window. The data associated with the one or more sensors may be received from the one or more sensors by the computing device. For example, the data may be received from the one or more sensors. For example, the data may be received from an access point in communication with the one or more sensors. The premises may comprise a building or structure such as a house or an office building.

At step 1020, signal characteristic data may be determined. The signal characteristic data may be associated with the one or more client devices. The signal characteristic data may be determined at a time the one or more client devices are located proximate the one or more sensors. The signal characteristic data may comprise data related to a signal strength, a transmission power, a connection status, channel information, an authentication status, an authorization status, network traffic, a signal to noise ratio, a data throughput, a bit error rate, a packet error rate, a packet retransmission rate, combinations thereof, and the like. For example, the signal characteristic data associated with the one or more client devices may comprise at least one of: a probe request, a transmission power, a received signal strength indicator (RSSI), a signal-to-noise ratio, a time of flight, a frequency, an amplitude, a data traffic characteristic, or an interference metric.

At step 1030, a position of the one or more client devices relative to the entry point or exit point of the premises may be determined. For example, the signal characteristic data associated with the one or more client devices may be determined when the one or more sensors is triggered. For example, the signal characteristic data may indicate that the one or more client devices is located within the boundary of the premises. For example, the signal characteristic data associated with the one or more client devices may comprise an RSSI of −30 dBm at a front door of the premises and an RSSI of −67 dBm at a back door of the premises. Such information may be determined upon installation or learned dynamically over time through the machine learning techniques described herein. The client device signal profile of the client device may comprise a previously known RSSI value of −80 dBm when the client device is located outside the boundary of the premises, and an RSSI of −67 dBm or greater at all times the client device is located inside the boundary of the premises.

At step 1040, a position of the one or more client devices relative to the boundary of the premises may be determined. The position of the one or more client devices may be determined relative to one or more access points. For example, the signal characteristic data associated with the one or more client devices may comprise an RSSI of −30 dBm at a front door of the premises and an RSSI of −67 dBm at a back door of the premises. Such information may be determined upon installation or learned dynamically over time through the machine learning techniques described herein. The client device signal profile of the client device may comprise a previously known RSSI value of −80 dBm when the client device is located outside the boundary of the premises, and an RSSI of −67 dBm or greater at all times the client device is located inside the boundary of the premises.

At 1050, a boundary of the premises may be determined. The boundary of the premises may be determined based on the signal characteristic data associated with the one or more client devices. For example, the signal characteristic data may comprise an RSSI of a particular client device at an entryway into a premises. For example, the signal characteristic data of the client device may comprise an RSSI of −30 dBm at a front door of the premises and an RSSI of −67 dBm at a back door of the premises. Such information may be determined upon installation or learned dynamically over time through the machine learning techniques described herein. The signal characteristic data associated with the one or more client devices may comprise a previously known RSSI value of −80 dBm when the client device is located outside the boundary of the premises, and an RSSI of −67 dBm or greater at all times the client device is located inside the boundary of the premises. For example, the position of the one or more client devices may be determined periodically so as to monitor the a movement of the one or more client devices while the one or more client devices are inside the boundary of the premises. For example, one it has been determined that the one or more client devices is located inside the boundary of the premises, the signal characteristic data associated with the one or more client devices may be monitored to see how the signal characteristic data changes while the one or more client devices moves around the premises. However, upon determining the one or more client devices has left the premises, the signal characteristic data associated with the one or more client devices may no longer be monitored. In this manner, the computing device may determine the boundary of the premises by repeatedly determining the signal characteristic data. For example, the computing device may repeatedly determine the RSSI associated with the one or more client devices for the duration of time the one or more client devices is located inside the boundary of the premises. Using the techniques as described herein, or other known techniques for calculating the distance from the one or more client devices to the access points based on RSSI, the computing device may determine the position of the boundary relative to the access points.

Turning now to FIG. 11 an example method 1100 is shown. The method 1100 may be implemented by any suitable computing device such as the computing device 102, the analytics engine 116, the sensor 108, the access points 106A, 106B, 106C, the client devices 107A, 107B, 107C, or any other devices described herein.

At step 1110, an input may be determined. The input may be determined by a computing device. The computing device may comprise a server, gateway, router, modem, or the like. The input may be associated with a sensor (e.g., the sensor 108) proximate a premises. The input may comprise a signal. The signal may include an event (e.g., door window being opened/broken, motion camera being triggered, etc.) and a timestamp. The signal may include an indication that a door or window has been opened or that the sensor has been triggered. The signal may comprise an identifier identifying which window or door has been opened or broken. The sensor may comprise a motion detection sensor, infrared sensor, camera sensor, magnetic sensor, or any other suitable sensor to detect the presence of an entity or a change in circumstances. For example, the sensor may comprise a window or door sensor which, when the window or door is closed, maintain a magnetic connection but when the window or door is opened, the magnetic connection is broken and the signal is sent which indicates a window has been opened or broken. The aforementioned is merely an example is not intended to be limiting. The sensor may comprise any suitable sensor.

The input may comprise an indication that a client device is within a coverage area. The input may comprise, for example, a probe request. The probe request may comprise signal characteristic data associated with the probe request such as a transmission power, a received signal strength indicator, characteristics associated with the data packet such as channel transmission and the like. The probe request may comprise a device identifier associated with the client device.

At step 1120, a signal profile may be determined. The signal profile may comprise a client device signal profile. The client device signal profile may comprise signal characteristic data associated with the client device connected to the wireless network. The client device signal profile may comprise one or more signal characteristic values associated with the client device. The client device signal profile may be determined in response to receiving a signal that a window or door has been opened or broken. The client device signal profile may comprise previously known values associated with the signal characteristic data, for example an RSSI of a particular client device at an entryway into a premises. For example, the client device signal profile of the client device may comprise an RSSI of −30 dBm at a front door of the premises and an RSSI of −67 dBm at a back door of the premises. Such information may be determined upon installation or learned dynamically over time through the machine learning techniques described herein. The client device signal profile of the client device may comprise a previously known RSSI value of −80 dBm when the client device is located outside the boundary of the premises, and an RSSI of −67 dBm or greater at all times the client device is located inside the boundary of the premises.

At step 1130, a change in at least one signal characteristic associated with the client device may be determined. It may be determined that the change in the at least one signal characteristic associated with the client device connected to the wireless network satisfies a threshold. The threshold may be associated with a value. The threshold may be associated with a change in the value. For example, a change in RSSI of greater than 10 dBm may satisfy the threshold. As such, if the client device has at a first time an RSSI of −30 dBM and then the client device has an RSSI at a second time of −67 dBm, that change may satisfy the threshold. The aforementioned example is meant only to be explanatory and not limiting in any way.

At step 1140, a target device may be determined. The target device may be a device associated with the change in the at least one signal characteristic. The target device may be the client device. For example, the target device may be the client device associated with the change in the signal characteristic that satisfies the threshold. For example, at a first time, the client device may send a signal with an RSSI of −67 dBm at a first time. The sensor may be triggered. The client device may now have an RSSI of −30 dBm. As such, the client device may be identified as the target device. The target device may be associated with a target device identifier. The target device identifier may comprise, for example, a MAC address. The aforementioned example is merely exemplary and is not intended to be limiting.

At step 1150, a status associated with the target device may be determined. The status associated with the target device may comprise an indication as to whether the target device is currently inside the boundary of the premises or outside the boundary of the premises. The status associated with the target device may comprise, for example, an authorized status or unauthorized status. The status may be determined based on the client device signal profile. The status may be determined based on the device identifier.

At step 1160, a message may be sent. The message may be sent based on the status associated with the target device. The message may comprise the target device identifier. The message may comprise, for example, an alarm message. The message may comprise, for example, a disarm message. For example, the message may be sent to a third party which provides security services. The message may comprise data related to system settings. For example, the message may comprise data related to audio or lighting settings. For example, the message may comprise data related to pathway lighting on the exterior of the premises or other visual or audio settings. For example, the message may be sent to a user device. The message may comprise an option for a user to confirm the message. For example, the message may comprise the alarm message and the user may either confirm or deny the alarm message. Likewise, the user may confirm or deny the setting.

The above method may be executed by any suitable computing device described herein, such as the computing device 102 comprising the analytics engine 116.

Turning now to FIG. 12, an example method 1200 is shown. The method 1200 may be implemented by any suitable computing device such as the computing device 102, the analytics engine 116, the sensor 108, the access points 106A, 106B, 106C, the client devices 107A, 107B, 107C, or any other devices described herein.

At step 1210, a computing device may receive an input. The input may be associated with a sensor (e.g., the sensor 108) proximate a premises. The computing device may comprise any suitable computing device as described herein. For example, the computing device may comprise at least one of a server, modem, router, gateway, or access point. The input may comprise a signal. The signal may be generated by the sensor proximate the premises. The sensor may comprise at least one of a motion detector, thermal sensor, window alarm, door alarm, proximity sensor, or camera. For example, the signal may indicate that a motion detector or some other sensor has been triggered or that a window or door has been opened or broken.

In an embodiment, the sensor may comprise an access point. The input associated with the access point may comprise an indication that a probe request has been received. The input may comprise additional information such as a transmission power, received signal strength, or other telecommunications signal data. The input may comprise an indication that a client device is within a coverage area. The input may comprise, for example, a probe request. The probe request may comprise signal characteristic data associated with the probe request such as a transmission power, a received signal strength indicator, characteristics associated with the data packet such as channel transmission and the like. The probe request may comprise a device identifier associated with the client device.

At step 1220, a client device may be determined. The client device may comprise at least one of a computer, laptop, smart phone, tablet, or other device capable of connection to the wireless network. The client device may be determined based on the input associated with the sensor proximate the premises. The client device may be associated with a client device identifier. The client device identifier may comprise, for example, a MAC address. The client device identifier may be included in the probe request. Additional data may be included in the probe request such as an RSSI, transmission power or other similar data such as a data reception rate, a data transmission rate, an amount of wireless network traffic processed, an error rate, a retransmission rate, a combination thereof, and the like.

At step 1230, a client device signal characteristic may be determined. For example, the client device signal characteristic may comprise a received signal strength. For example, the client device signal characteristic may comprise the RSSI. For example, the client device signal characteristic may comprise an RSSI of −30 dBm. This RSSI may be associated with a client device status of "inside" the boundary of a premises. For example, a client device signal characteristic comprising an RSSI of −67 dBM may be associated with a client device status of "outside" the boundary of the premises.

At step 1240, a client device status may be determined. The client device status may be determined based on the client device signal characteristic. The client device status may comprise an indication as to whether the client device is currently inside the boundary of the premises or outside the boundary of the premises. The client device status may comprise, for example, an authorized status or unauthorized status. The client device status may be determined based on the device identifier.

At step 1250, a message may be sent. The message may be sent based on the client device status. The message may comprise the client device identifier. The message may comprise, for example, an alarm message. The message may comprise, for example, a disarm message. For example, the message may be sent to a third party which provides security services. The message may comprise data related to system settings. For example, the message may comprise data related to audio or lighting settings. For example, the message may comprise data related to pathway lighting on the exterior of the premises or other visual or audio settings. The message may comprise an option for a user to confirm the message. For example, the message may comprise the alarm message and the user may either confirm or deny the alarm message. Likewise, the user may confirm or deny the setting.

Turning now to FIG. 13, an example method 1300 is shown. The method 1300 may be implemented by any suitable computing device such as the computing device 102, the analytics engine 116, the sensor 108, the access points 106A, 106B, 106C, the client devices 107A, 107B, 107C, or any other devices described herein. At step 1310, an input may be determined. The input may be associated with a sensor proximate a premises. The input may be determined by a computing device. The computing device may comprise a server, gateway, router, modem, or the like. The input may be associated with the sensor proximate a premises. The input may comprise a signal. The signal may include an event (e.g., door window being opened/broken, motion camera being triggered, etc.) and a timestamp. The signal may include an indication that a door or window has been opened or that the sensor has been triggered. The signal may comprise an identifier identifying which window or door has been opened or broken. The sensor may comprise a motion detection sensor, infrared sensor, camera sensor, magnetic sensor, or any other suitable sensor to detect the presence of an entity or a change in circumstances. For example, the sensor may comprise a window or door sensor which, when the window or door is closed, maintain a magnetic connection but when the window or door is opened, the magnetic connection is broken and the signal is sent which indicates a window has been opened or broken. The aforementioned is merely an example is not intended to be limiting. The sensor may comprise any suitable sensor.

The input may comprise an indication that a client device is within a coverage area. The input may comprise, for example, a probe request. The probe request may comprise signal characteristic data associated with the probe request such as a transmission power, a received signal strength indicator, characteristics associated with the data packet such as channel transmission and the like. The probe request may comprise a device identifier associated with the client device.

At step 1320, a client device may be determined. The client device may comprise a computer, smartphone, tablet, laptop, or the like. The client device may comprise a smart speaker or other device configured so as to connect to the wireless network. The client device may comprise a client device identifier. For example, the client device identifier may comprise a MAC address or some other similar identifier. The client device may be associated with premises. For example, the client device may be a known device that has been within the boundary of the premises before. The client device may be an authorized client device. For example, the computing device may maintain a list of authorized client devices. Each authorized client device on the list of authorized client devices may be associated with a user profile.

At step 1330, a user profile may be determined. The user profile may be determined based on the client device. For example, the user profile may be determined based on the client device identifier. For example, the computing device may receive the input associated with the sensor proximate the premises, determine a client device based on the input (e.g., a known RSSI signal associated with a point of entry into the premises), and based on the input, query a database to determine the user profile. The user profile may be associated with a plurality of settings. For example, the user profile may be associated with a "disarm" setting of an alarm setting. For example, the user profile may be associated with certain lighting or audio settings. For example, the user profile may be associated with exterior or interior lighting settings.

At step 1340, a setting may be determined. For example, a "disarm" setting may be determined. For example, the user profile may be associated with certain lighting or audio settings. For example, the user profile may be associated with exterior or interior lighting settings and a particular lighting setting may be implemented so as to illuminate a particular pathway or room.

At step 1350, a message may be sent. The message may be sent based on the setting of the plurality of settings. For example, the message may be sent to the computing device. The computing device may execute an action based on the message. For example, the computing device may send a signal which causes an alarm system to arm or disarm. For example, the computing device may send a signal to a lighting or audio system. For example, the computing device may send a signal which causes exterior or interior lighting settings and a particular lighting setting may be implemented so as to illuminate a particular pathway or room. For example, the message may be sent to a third party server such as a security services server. The message may comprise an option for a user to confirm the message. For example, the message may comprise the alarm message and the user may either confirm or deny the alarm message. Likewise, the user may confirm or deny the setting.

Turning now to FIG. 14, a block diagram of an example system 1400 for monitoring or managing the wireless network is shown. The system 1400 may include one or more of the devices/entities shown in FIG. 1 with respect to the system 100. Any of the computing device 102, the analytics engine 116, gateways, the access points 106A, 106B, 106C, sensors (e.g., the sensor 108), client devices 107A, 107B, 107C or the like may be a computer such as computer 1401. Likewise, any of the computing device 102, the analytics engine 116, gateways, AP, sensors, client devices 107A, 107B, 107C or the like may be a remote computing device such as any of remote computing devices 1414A-C. The computer 1401 may comprise one or more processors 1403, a system memory 1412, and a bus 1413 that couples various system components including the one or more processors 1403 to the system memory 1412. In the case of multiple processors 1403, the computer 1401 may utilize parallel computing. The bus 1413 is one or more of several possible types of bus structures, including a memory bus or memory controller, a peripheral bus, an accelerated graphics port, or local bus using any of a variety of bus architectures.

The computer 1401 may operate on and/or comprise a variety of computer readable media (e.g., non-transitory). The readable media may be any available media that is accessible by the computer 1401 and may comprise both volatile and non-volatile media, removable and non-removable media. The system memory 1412 has computer readable media in the form of volatile memory, such as random access memory (RAM), and/or non-volatile memory, such as read only memory (ROM). The system memory 1412 may store data such as the presence detection data 1407 and/or program modules such as the operating system 1405 and the presence detection software 1406 that are accessible to and/or are operated on by the one or more processors 1403.

The computer 1401 may also have other removable/non-removable, volatile/non-volatile computer storage media. FIG. 14 shows the mass storage device 1404 which may provide non-volatile storage of computer code, computer readable instructions, data structures, program modules, and other data for the computer 1401. The mass storage device 1404 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any quantity of program modules may be stored on the mass storage device 1404, such as the operating system 1405 and the presence detection software 1406. Each of the operating system 1405 and the presence detection software 1406 (or some combination thereof) may comprise elements of the program modules and the presence detection software 1406. The presence detection data 1407 may also be stored on the mass storage device 1404. The presence detection data 1407 may be stored in any of one or more databases known in the art. Such databases may be DB2®, Microsoft® Access, Microsoft® SQL Server, Oracle®, MySQL, PostgreSQL, and the like. The databases may be centralized or distributed across locations within the network 1415.

A user may enter commands and information into the computer 1401 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 1403 via a human machine interface 1402 that is coupled to the bus 1413, but may be connected by other interface and bus structures, such as a parallel port, game port, an IEEE 1394 Port (also known as a Firewire port), a serial port, network adapter 1408, and/or a universal serial bus (USB).

The display device 1411 may also be connected to the bus 1413 via an interface, such as the display adapter 1409. It is contemplated that the computer 1401 may comprise more than one display adapter 1409 and the computer 1401 may comprise more than one display device 1411. The display device 1411 may be a monitor, an LCD (Liquid Crystal Display), light emitting diode (LED) display, television, smart lens, smart glass, and/or a projector. In addition to the display device 1411, other output peripheral devices may be components such as speakers (not shown) and a printer (not shown) which may be connected to the computer 1401 via the Input/Output Interface 1410. Any step and/or result of the methods may be output (or caused to be output) in any form to an output device. Such output may be any form of visual representation, including, but not limited to, textual, graphical, animation, audio, tactile, and the like. The display device 1411 and computer 1401 may be part of one device, or separate devices.

The computer 1401 may operate in a networked environment using logical connections to one or more remote computing devices 1414A-C. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, sensor, a server, a router, a network computer, a peer device, edge device, and so on. Logical connections between the computer 1401 and a remote computing device 1414A-C may be made via a network 1415, such as a local area network (LAN) and/or a general wide area network (WAN). Such network connections may be through the network adapter 1408. The network adapter 1408 may be implemented in both wired and wireless environments. Such networking environments are conventional and commonplace in dwellings, offices, enterprise-wide computer networks, intranets, and the Internet.

Application programs and other executable program components such as the operating system 1405 are shown herein as discrete blocks, although it is recognized that such programs and components reside at various times in different storage components of the computing device 1401, and are executed by the one or more processors 1403 of the computer. An implementation of the presence detection software 1406 may be stored on or sent across some form of computer readable media. Any of the described methods may be performed by processor-executable instructions embodied on computer readable media.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method, comprising:
   receiving data associated with one or more sensors located at an entry point or exit point of a premises;
   determining, based on the data associated with the one or more sensors, signal characteristic data associated with one or more client devices at a time at which the one or more client devices are proximate to the one or more sensors;
   determining, based on the signal characteristic data associated with the one or more client devices and the data associated with the one or more sensors, an authorized client device of the one or more client devices; and
   providing a network service to the authorized client device.

2. The method of claim 1, wherein the data associated with the one or more sensors located at the entry point or the exit point of the premises comprises an indication that a door or window has been opened or broken.

3. The method of claim 1, wherein the signal characteristic data associated with the one or more client devices comprises at least one of: a probe request, a transmission power, a received signal strength indicator (RSSI), a signal-to-noise ratio, a time of flight, a frequency, an amplitude, a data traffic characteristic, a MAC address, or an interference metric.

4. The method of claim 1, further comprising:
   determining, based on the signal characteristic data associated with the one or more client devices, a signal characteristic data profile associated with the one or more client devices; and
   comparing, the signal characteristic data profile associated with the one or more client devices to the signal characteristic data associated with the one or more client devices.

5. The method of claim 1, further comprising:
   determining, based on the signal characteristic data associated with the authorized client device, a user profile associated with the authorized client device; and
   causing, based on the user profile associated with the authorized client device, an action.

6. The method of claim 5, wherein the action comprises at least one of: sending a message, triggering an alarm, determining a lighting setting, or determining an audio setting.

7. The method of claim 6, wherein sending the message comprises:
   sending, to a computing device, the message, wherein the message comprises at least one of: the signal characteristic data associated with the one or more client devices, a position of the one or more client devices, an identifier associated with the one or more client devices, or an option associated with the one or more client devices.

8. A method comprising:
   receiving data associated with one or more sensors located at an entry point or an exit point of a premises indicating entry into the premises;
   determining, based on the data associated with the one or more sensors, signal characteristic data associated with one or more client devices at a time at which the one or more client devices are proximate the one or more sensors;
   determining, based on the signal characteristic data associated with the one or more client devices and the data associated with the one or more sensors, a position of an unauthorized client device of the one or more client devices; and
   causing, based the position of the unauthorized client device, a security action.

9. The method of claim 8, wherein the data associated with the one or more sensors located at the entry point or the exit point of the premises comprises an indication that a door or window has been opened or broken.

10. The method of claim 8, wherein the one or more sensors comprise at least one of a motion detector, a thermal sensor, a window alarm, a door alarm, a proximity sensor, or a camera.

11. The method of claim 8, wherein the one or more client devices comprises at least one of a computer, laptop, mobile phone, or tablet.

12. The method of claim 8, wherein the signal characteristic data associated with the one or more client devices comprises at least one of a received signal strength indicator, transmission power, data traffic characteristic, or probe request.

13. The method of claim 8, wherein determining the unauthorized client device comprises:
- determining, based on the signal characteristic data associated with the one or more client devices, a signal characteristic data profile associated with the one or more client devices; and
- comparing, the signal characteristic data profile associated with the one or more client devices to the signal characteristic data associated with the one or more client devices.

14. The method of claim 8, wherein the security action comprises a home security action or a network security action.

15. A method comprising:
- receiving data associated with one or more sensors located at an entry point or an exit point of a premises;
- determining, based on the data associated with the one or more sensors, signal characteristic data associated with one or more client devices at a time at which the one or more client devices are proximate the one or more sensors;
- determining, based on the signal characteristic data associated with the one or more client devices, a position of the one or more client devices relative to the entry point or the exit point of the premises; and
- determining, based on the signal characteristic data associated with the one or more client devices, a position of the one or more client devices relative to one or more access points.

16. The method of claim 15, wherein the one or more sensors comprise at least one of a motion detector, a thermal sensor, a window alarm, a door alarm, a proximity sensor, or a camera.

17. The method of claim 15, wherein the data associated with the one or more sensors located at the entry point or the exit point of the premises comprises an indication that a door or window has been opened or broken.

18. The method of claim 15, wherein the signal characteristic data associated with the one or more client devices comprises at least one of: a probe request, a transmission power, a received signal strength indicator (RSSI), a signal-to-noise ratio, a time of flight, a frequency, an amplitude, a data traffic characteristic, a MAC address, or an interference metric.

19. The method of claim 15, further comprising:
- determining, based on the signal characteristic data associated with the one or more client devices, an authorized client device or an unauthorized client device.

20. The method of claim 15, further comprising:
- causing, based on the signal characteristic data associated with the one or more client devices and the position of the one or more client devices relative to the one or more access points, an action, wherein the action comprises at least one of a user setting or security action.

21. The method of claim 1, further comprising:
- determining, based on the signal characteristic data associated with the one or more client devices, a boundary of the premises.

22. The method of claim 8, further comprising:
- determining, based on the signal characteristic data associated with the one or more client devices, a boundary of the premises.

23. The method of claim 15, further comprising:
- determining, based on the position of the one or more client devices relative to the entry point or the exit point of the premises and the position of the one or more client devices relative to the one or more access points, a boundary of the premises.

* * * * *